(12) United States Patent
Subramanian

(10) Patent No.: US 11,371,210 B2
(45) Date of Patent: Jun. 28, 2022

(54) SYSTEMS AND METHODS FOR MATERIAL TRANSPORT

(71) Applicant: Caterpillar Inc., Peoria, IL (US)

(72) Inventor: Gautham Subramanian, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 312 days.

(21) Appl. No.: 16/670,975

(22) Filed: Oct. 31, 2019

(65) Prior Publication Data

US 2021/0131064 A1 May 6, 2021

(51) Int. Cl.
*E02F 9/20* (2006.01)
*E02F 9/26* (2006.01)
*G01C 21/36* (2006.01)

(52) U.S. Cl.
CPC .............. *E02F 9/2045* (2013.01); *E02F 9/26* (2013.01); *G01C 21/3667* (2013.01)

(58) Field of Classification Search
CPC ...... E02F 9/2045; E02F 9/26; G01C 21/3667; G06Q 10/08
See application file for complete search history.

(56) References Cited

U.S. PATENT DOCUMENTS

| | | | | |
|---|---|---|---|---|
| 5,646,844 A * | 7/1997 | Gudat | ..................... | E02F 3/842 |
| | | | | 701/409 |
| 6,421,586 B1 * | 7/2002 | Nicotera | ................ | G06Q 10/08 |
| | | | | 701/1 |
| 8,862,390 B2 | 10/2014 | Sugawara et al. | | |
| 9,464,913 B2 | 10/2016 | Brown et al. | | |
| 10,613,524 B2 * | 4/2020 | Marsolek | ............. | G07C 5/0825 |
| 2005/0209869 A1 * | 9/2005 | Irvin | ...................... | G06Q 20/10 |
| | | | | 705/39 |
| 2011/0153143 A1 | 6/2011 | O'Neil et al. | | |
| 2013/0198088 A1 * | 8/2013 | Mewes | ................... | G06Q 10/20 |
| | | | | 705/305 |
| 2016/0035149 A1 | 2/2016 | Friend | | |
| 2017/0205814 A1 | 7/2017 | Marsolek | | |
| 2017/0205999 A1 * | 7/2017 | Marsolek | ................ | E01C 19/48 |
| 2017/0228108 A1 * | 8/2017 | Marsolek | ............. | G06F 3/0482 |
| 2020/0327464 A1 * | 10/2020 | Kato | .................... | G05B 19/418 |

* cited by examiner

*Primary Examiner* — Tyler J Lee
(74) *Attorney, Agent, or Firm* — Xsensus LLC

(57) ABSTRACT

A method may include receiving, with a controller, at least one signal from a communication device associated with a hauling machine. The signal may include position information indicating a position of the hauling machine along a travel path the hauling machine is assigned to traverse extending between a material transfer site to a dump site, a payload capacity of the hauling machine, and an estimated volume of a material loaded into the hauling machine based on the payload capacity of the hauling machine. The method may also include defining, with the controller, a degree of completion of a material transport based on the position information.

19 Claims, 7 Drawing Sheets

SYSTEMS AND METHODS FOR MATERIAL TRANSPORT

TECHNICAL FIELD

The present disclosure relates to a material transport system, and methods of tracking progress in the transport of material. More specifically, the present disclosure relates to the use of a controller configured to associate a hauling machine identifier with a location sensor.

BACKGROUND

Hauling machines, paving machines, and other types of machines may be used to perform a variety of tasks associated with movement of materials such as dirt, concrete, gravel, and even waste or refuse. For example, a hauling machine may be used to transport paving material from a paving plant to a worksite so that the paving material may be distributed along a paving surface by one or more paving machines. The operation of such machines may be coordinated in order to perform operations in an efficient manner. A ticketing system may be used to determine an amount of material such as the paving material in this example that is transported from an asphalt plant to a worksite. The ticketing system may generate a physical or data-based material ticket with a controller or other processing device. The ticket may include information such as an indication of the weight, volume, composition, temperature, and/or other characteristics of the material deposited into the hauling machine. Further, the ticket may include identifying the worksite at which the material will be utilized, and information uniquely identifying the particular hauling machine receiving the material, among other types of information. In this example, the material ticket may include information indicating the material loaded into the haul machine at the paving plant and a first identifier unique to the haul machine. However, some locations may not participate in or have the hardware and/or software infrastructure to support a ticketing system.

An example system for use in loading a target machine is described in U.S. Pat. No. 9,464,913 (hereinafter referred to as the '913 reference). In particular, the '913 reference describes global positioning system (GPS) sensors located on each of a spotter vehicle and a target machine. An operator interface located on the target machine displays visual cues and an operator interface located on the spotter vehicle displays specific auditory cues. An analyzer is configured to interface with the GPS sensors, the target machine user interface, and the spotter vehicle operator interface to plan a path for the spotter vehicle to follow to the target location. The analyzer is further configured to provide at least specific auditory cues to aid a spotter vehicle operator in guiding the spotter vehicle to the target location along the path. When the two machines are near one another, an operator may receive an alert on, for example, a graphical user interface (GUI) located in one of the machines. However, the system described in the '913 reference is reliant upon a physical or electronic ticketing system for tracking the material being loaded in and carried by the various system vehicles. The described system also lacks the ability to accurately track entry into or exit from various areas designated at a worksite. As a result, the system described in the '913 reference lacks the ability to effectively create a ticket in situations where a material facility at which material may be acquired does not have a set of scales or other means of metering a mass or volume of the material that is dispensed into a material hauling machine.

Examples of the present disclosure are directed toward overcoming the deficiencies described above.

SUMMARY

In an example of the present disclosure, a method may include receiving, with a controller, at least one signal from a communication device associated with a hauling machine. The signal may include position information indicating a position of the hauling machine along a travel path the hauling machine is assigned to traverse extending between a material transfer site to a dump site, a payload capacity of the hauling machine, and an estimated volume of a material loaded into the hauling machine based on the payload capacity of the hauling machine. The method may also include defining, with the controller, a degree of completion of a material transport based on the position information.

In another example of the present disclosure, a system may include a controller, and a network configured to transmit signals between a communication device associated with a hauling machine and the controller. The controller is configured to receive at least one signal from the communication device. The signal may include position information indicating a position of the hauling machine along a travel path the hauling machine is assigned to traverse extending between a material transfer site to a dump site, and an estimated volume of a material loaded into the hauling machine based on a payload capacity of the hauling machine. The controller may further be configured to define a degree of completion of a material transport based on the position information.

In yet another example of the present disclosure, a method may include receiving, with a controller, at least one signal from a communication device associated with a hauling machine moving along a travel path assigned to the hauling machine to traverse, the travel path extending between a first area within a material transfer site to a second area within a dump site, the signal including an estimated volume of a material loaded into the hauling machine based on a payload capacity of the hauling machine, and generating, with the controller, a ticket identifying a purchaser of the estimated volume of the material.

DETAILED DESCRIPTION

Figure 1:
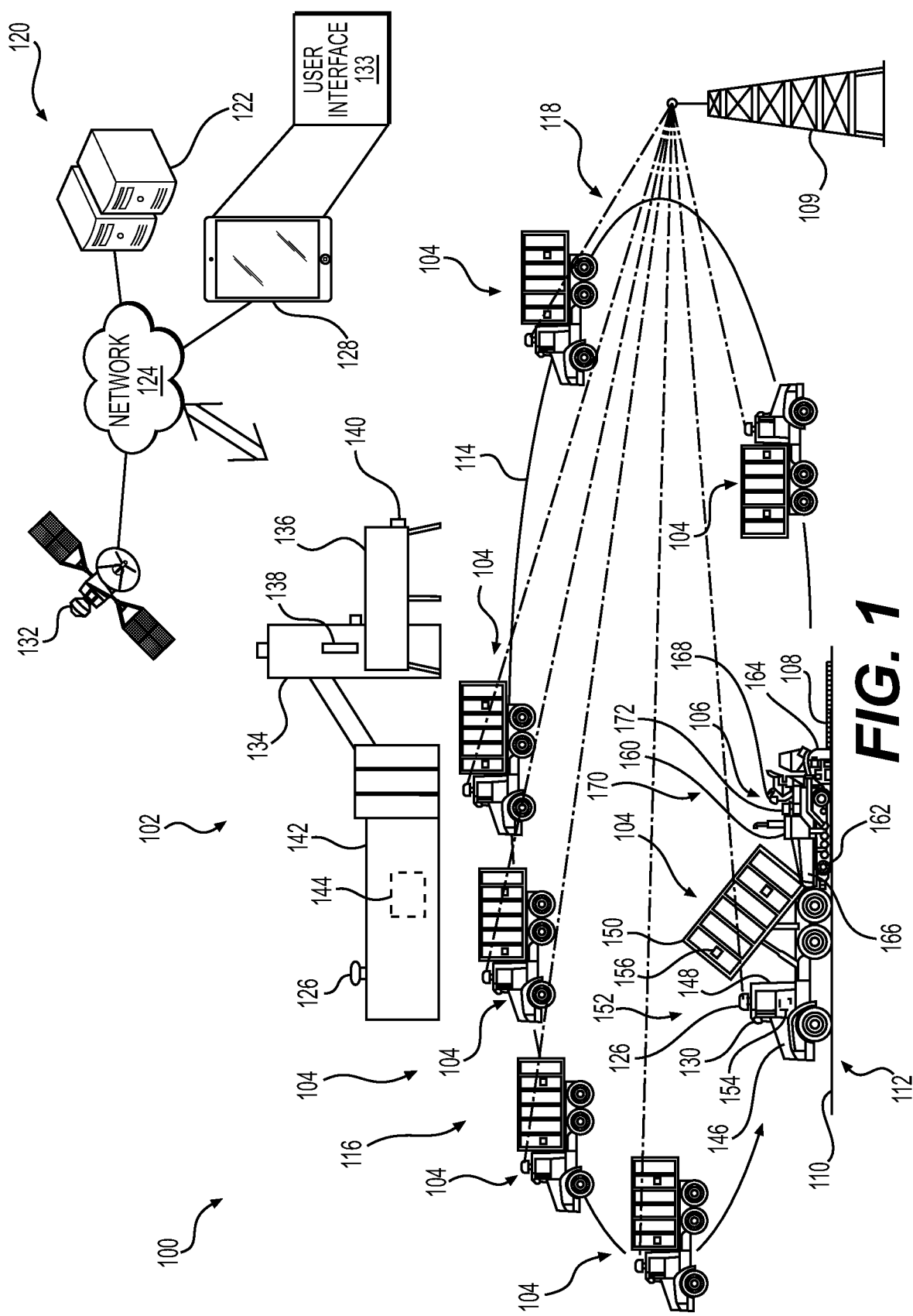
FIG. 1 is a schematic illustration of a system in accordance with an example embodiment of the present disclosure.

Wherever possible, the same reference numbers will be used throughout the drawings to refer to the same or like parts. Referring to FIG. 1, an example material transport system 100 may include one or more material plants 102 for producing or providing a material 108. In the examples described herein, the material may include a paving material such as asphalt, and the material plant 102 may be an asphalt plant. However, the material plant 102 may produce or provide any material including gravel, soil, dirt, and concrete, among other materials. Further, the material plant 102, in some examples described herein may include a material depository plant such as a recycling center, a refuse transfer plant, or other material depositories. As described herein, the material plant 102 may include a weigh station or other facility/component that can determine a volume and/or mass of material 108 taken from or brought to the material plant 102. In other examples, on the other hand, the material plant 102 may not include a weigh station or other such component. In this situation, it may be difficult for a foreman or plant operator to determine the exact amount of (e.g., volume and/or mass) of material 108 and bill for or otherwise account for that volume and/or mass of material 108. Further, it may prove difficult to determine a degree of completion of a worksite plan that utilizes, at least in part, the volume and/or mass of material 108 to make such a determination. Thus, the present description provides the system 100 and methods to account for the material 108 and determine the degree of completion of the worksite plan.

A plurality of machines such as one or more hauling machines 104 for transporting the material 108 may be included within and used in connection with the system 100. In one example, a paving machine 106 for applying a layer of material 108 such as asphalt to a work surface 110 at a worksite 112 may also be included. The machines described herein may also be referred to herein and within the claims as equipment.

In one example, the paving machine 106 may serve as a destination for the hauling machine 104 and/or as a location at which the hauling machine(s) 104 dump or deposit the material 108. In another example, the system 100 may not include the paving machine 106 and may have a dumpsite the hauling machine(s) 104 dump the material 108. It is noted that the material plant 102 and the paving machine 106 and/or the dumpsite may both serve as locations at which the material 108 may be obtained or deposited. Thus, the worksite 112 may include, for example, a construction site, a roadwork site, a parking lot, or any other type of job site. In one example, one or more hauling machines 104 may be operative to transport material 108 from the material plant 102 to a paving machine 106 at the worksite 112. A hauling machine 104 may be loaded with material 108 at the material plant 102. The hauling machine 104 may then travel to the appropriate paving machine 106 at the worksite 112 and transfer the material 108 to the paving machine 106. The paving machine 106 may then apply the material 108 to the work surface 110. In another example, the one or more hauling machines 104 may be operative to transport material 108 such as dirt or gravel to a dump site. In this example, the hauling machine 104 may be loaded with the material 108 at the material plant 102. The hauling machine 104 may then travel to the appropriate dump site at the worksite 112 and deposit the material 108 at the dump site. Other machines such as grading machines and compacting machines may then use the material 108 to build up or create the work surface 110.

Each of the machines described herein may be in communication with each other and/or with a local or remote-control system 120 by way of one or more central stations 109. The central station 109 may facilitate wireless communication between the machines described herein and/or between such machines and, for example, a system controller 122 of the control system 120, for the purpose of transmitting and/or receiving operational data and/or instructions.

With continued reference to FIG. 1, in some examples the control system 120 and/or the system controller 122 may be located at a command center (not shown) remote from the worksite 112. In other examples, the system controller 122 and/or one or more components of the control system 120 may be located at the worksite 112. Regardless of the location of the various components of the control system 120, such components may be configured to facilitate communications between, and to provide information to, the hauling machines 104, and/or other machines of the system 100. In any of the examples described herein, the functionality of the system controller 122 may be distributed so that certain operations are performed at the worksite 112 and other operations are performed remotely (e.g., at the remote command center noted above). For example, some operations of the system controller 122 may be performed at the worksite 112 on one or more of the hauling machines 104, and other machines described herein. It is understood that the system controller 122 may comprise a component of the system 100, a component of one or more of the machines disposed at the worksite 112, a component of a separate mobile device (e.g., a mobile phone, a tablet, a laptop computer, etc.), and/or the control system 120.

The system controller 122 may be an electronic controller that operates in a logical fashion to perform operations, execute control algorithms, store and retrieve data and other desired operations. The system controller 122 may include or access memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the system controller 122 such as power supply circuitry, signal conditioning circuitry, driver circuitry, and other types of circuitry.

The system controller 122 may be a single controller or may include more than one controller (such as additional controllers associated with each of the hauling machines 104, and/or other machines of the system 100) configured to control various functions and/or features of the system 100. As used herein, the term "controller" is meant in its broadest sense to include one or more controllers, processors, central processing units, and/or microprocessors that may be associated with the system 100, and that may cooperate in controlling various functions and operations of the machines included in the system 100. The functionality of the system controller 122 may be implemented in hardware and/or software without regard to the functionality. The system controller 122 may rely on one or more data maps, look-up tables, neural networks, algorithms, machine learning algorithms, and/or other components relating to the operating conditions and the operating environment of the system 100 that may be stored in the memory of the system controller 122. Each of the data maps noted above may include a collection of data in the form of tables, graphs, and/or equations to maximize the performance and efficiency of the system 100 and its operation.

The components of the control system 120 may be in communication with and/or otherwise operably connected to any of the components of the system 100 via a network 124. The network 124 may be a local area network (LAN), a larger network such as a wide area network (WAN), or a collection of networks, such as the Internet. Protocols for network communication, such as TCP/IP, may be used to implement the network 124. Although embodiments are described herein as using a network 124 such as the Internet, other distribution techniques may be implemented that transmit information via memory cards, flash memory, or other portable memory devices.

It is also understood that the hauling machines 104 and/or other machines of the system 100 may include respective controllers, and each of the respective controllers described herein (including the system controller 122) may be in communication and/or may otherwise be operably connected via the network 124. For example, the network 124 may comprise a component of a wireless communication system of the system 100, and as part of such a wireless communication system, the hauling machines 104 and/or other machines of the system 100 may include respective communication devices 126. Such communication devices 126 may be configured to permit wireless transmission of a plurality of signals, instructions, and/or information between the system controller 122 and the respective controllers of the hauling machines 104 and/or other machines of the system 100. Such communication devices 126 may also be configured to permit communication with other machines and systems remote from the worksite 112. For example, such communication devices 126 may include a transmitter configured to transmit signals (e.g., via the central station 109 and over the network 124) to a receiver of one or more other such communication devices 126. In such examples, each communication device 126 may also include a receiver configured to receive such signals (e.g., via the central station 109 and over the network 124). In some examples, the transmitter and the receiver of a particular communication device 126 may be combined as a transceiver or other such component. In any of the examples described herein, such communication devices 126 may also enable communication (e.g., via the central station 109 and over the network 124) with one or more tablets, computers, cellular/wireless telephones, personal digital assistants, mobile devices, or other electronic devices 128 located at the worksite 112 and/or remote from the worksite 112. Such electronic devices 128 may comprise, for example, mobile phones and/or tablets of project managers (e.g., foremen) overseeing daily operations at the worksite 112.

The network 124, communication devices 126, and/or other components of the wireless communication system described herein may implement or utilize any desired system or protocol including any of a plurality of communications standards. The desired protocols will permit communication between the system controller 122, one or more of the communication devices 126, and/or any other desired machines or components of the system 100. Examples of wireless communications systems or protocols that may be used by the system 100 described herein include a wireless personal area network such as Bluetooth® (e.g., IEEE 802.15), a local area network such as IEEE 802.11b or 802.11g, a cellular network, or any other system or protocol for data transfer. Other wireless communication systems and configurations are contemplated. In some instances, wireless communications may be transmitted and received directly between the control system 120 and a machine (e.g., a paving machine 106, a hauling machine 104, etc.) of the system 100 or between such machines. In other instances, the communications may be automatically routed without the need for re-transmission by remote personnel.

In example embodiments, one or more machines of the system 100 (hauling machines 104, etc.) may include a location sensor 130 configured to determine a location, speed, heading, and/or orientation of the respective machine. In such embodiments, the communication device 126 of the respective machine may be configured to generate and/or transmit signals indicative of such determined locations, speeds, headings, and/or orientations to, for example, the system controller 122 and/or to the other respective machines of the system 100. Further, in one example, the location sensor 130 of each of the machines may be configured to assist the system controller 122 and/or machine in determining the location of the machine with respect to, for example, the material plant 102, a dump site, a paving machine 106, and/or a position along a travel path between these locations and elements.

In some examples, the location sensors 130 of the respective machines may include and/or comprise a component of global navigation satellite system (GNSS) or a global positioning system (GPS). Alternatively, universal total stations (UTS) may be utilized to locate respective positions of the machines. In example embodiments, one or more of the location sensors 130 described herein may comprise a GPS receiver, transmitter, transceiver, laser prisms, and/or other such device, and the location sensor 130 may be in communication with one or more GPS satellites 132 and/or UTS to determine a respective location of the machine to which the location sensor 130 is connected continuously, substantially continuously, or at various time intervals. One or more additional machines of the system 100 may also be in communication with the one or more GPS satellites 132 and/or UTS, and such GPS satellites 132 and/or UTS may also be configured to determine respective locations of such additional machines. In any of the examples described herein, machine locations, speeds, headings, orientations, and/or other parameters determined by the respective location sensors 130 may be used by the system controller 122 and/or other components of the system 100 to coordinate activities of the hauling machines 104 and/or other components of the system 100. Further, in any of the examples described herein, machine locations, speeds, headings, orientations, and/or other parameters determined by the respective location sensors 130 may be used by the system controller 122 and/or other components of the system 100 to move the material 108 throughout the worksite 112 as described herein.

It is also understood that the material plant 102, the various hauling machines 104, the paving machine 106, compaction machines (not shown) and/or other components of the system 100 may include respective controllers, and each of the respective controllers may be in communication and/or may otherwise be operably connected via the network 124. For example, the network 124 may comprise a component of a wireless communication system of the system 100, and as part of such a wireless communication system, the material plant 102, the one or more hauling machines 104, the paving machine 106, the one or more compaction machines and/or other components of the system 100 may include respective communication devices 126. Such communication devices 126 may be configured to permit wireless transmission of a plurality of signals, instructions, and/or information between the material plant 102, the hauling machines 104, the paving machines 106, the compaction machines, the electronic device 128, and the system controller 122, as well as to permit communication with other machines and systems remote from the material plant 102, hauling machines 104, paving machines 106, and/or the worksite 112. For example, such communication devices 126 may include a transmitter configured to transmit signals to a receiver of one or more other such communication devices 126. In such examples, each communication device 126 may also include a receiver configured to receive such signals. In some examples, the transmitter and the receiver of a particular communication device 126 may be combined as a transceiver or other such component. In any of the examples described herein, such communication devices 126 may also enable communication with one or more tablets, computers, cellular/wireless telephones, personal digital assistants, mobile devices, or other electronic devices 128 located at the worksite 112, at the material plant 102, and/or remote from the worksite 112 or the material plant 102. Such electronic devices 128 may comprise, for example, mobile phones and/or tablets of project managers (e.g., foremen) overseeing daily operations at the worksite 112 and/or at the material plant 102.

In any of the examples described herein, machine locations determined by the respective location sensors 130 may be used by the system controller 122 and/or other components of the system 100 to coordinate activities of the hauling machines 104, paving machine 106, and/or other components of the system 100. For example, machine locations determined by the respective location sensors 130 may be used by the system controller 122 and/or other components of the system 100 to determine delivery rates of material 108 being delivered to the worksite 112 from the material plant 102. For instance, such machine locations may be used by the system controller 122 and/or other components of the system 100 to determine an arrival time at which one or more of the hauling machines 104 is expected to arrive at the worksite 112. Such an arrival time may be useful to minimize and/or avoid stoppages of the paving machine 106 caused by, for example, an inadequate supply of material 108 being delivered to the worksite 112 or to avoid congestion at the material plant 102 and/or the dump site/paving machine 106. For instance, as will be described in greater detail below, in some examples the system controller 122 and/or other components of the system 100 determine such an arrival time associated with a hauling machine 104 having a location sensor 130 that is missing or faulty.

The system controller 122 and/or other components of the system 100 may also generate a user interface 133 that includes, among other things, information indicative of the arrival time associated with the hauling machine 104. The system controller 122 may provide the user interface 133 to, for example, the electronic device 128, a hauling machine controller 154 of the hauling machines 104, a controller of the paving machine 106, and/or other components of the system 100, via the network 124, for display such that operation of the various components of the system 100 can be modified and/or otherwise controlled based at least in part on the determined arrival time. In examples in which the paving machine 106, compaction machines, and/or other components of the system 100 are operating under autonomous or semi-autonomous control, the speed, steering, paving rate, and/or other functions of such components may be controlled automatically or semi-automatically based at least in part on the determined arrival time.

With continued reference to FIG. 1, in some examples the material plant 102 may include various material delivery components, conveyors, mixers, heaters, and/or other equipment configured to assist in manufacturing and/or dispersing material 108 for use in various operations. Such equipment may include, for example, one or more conveyors or other devices configured to transport material 108 to one or more material silos 134 or other holding locations for storage therein. The material plant 102 may also include one or more load stations 136 configured to transfer material 108 from the one or more material silos 134 to the one or more hauling machines 104. In such examples, a material silo 134 may include one or more sensors 138 configured to determine a temperature of material 108 stored within the material silo 134, an amount of material 108 stored within the material silo 134 (e.g., a fill level of the material silo 134), or other detectable physical characteristic of the material silo 134 and/or the material stored therein. Similarly, the load station 136 may include one or more sensors 140 configured to determine the presence and/or location of one or more hauling machines 104, a time at which the hauling machine 104 arrived at the load station 136, a time at which the hauling machine 104 departed the load station 136, an exact or estimated amount (e.g., a weight) of material 108 loaded into the hauling machine 104, and/or other information associated with the hauling machine 104. In some examples, the sensor 140 may comprise a scale or other mass sensor configured to determine the weight of the hauling machine 104 upon entering the load station 136, the weight of the hauling machine 104 after material 108 has been loaded into the hauling machine 104, and/or a change in weight of the hauling machine 104. In another example, the sensor 140 may sense the presence of the hauling machine 104 and a payload capacity of a dump body 150 of the hauling machine 104. In this example, the load station 136 may deposit an amount of material 108 within the dump body 150 based on the payload capacity of the dump body 150. In one example, the load station 136 may identify the hauling machine 104 and determine the payload capacity of the hauling machine 104 via use of a look-up table or other data storage array, and the may estimate an amount of material 108 to deposit into the hauling machine 104. The look-up table may include a list of hauling machines and a respective capacity indicator that defines the payload capacity. In one example, the estimated amount of material 108 deposited in the hauling machine 104 may be equal or less than the payload capacity. Further, in one example, an operator of the load station 136 may deposit an estimated amount of material 108 into the dump body 150 of the hauling machine 104 as the operator visually confirms that the dump body 150 is filled. The operator, in these examples, may use the capacity indicator from the look-up table, indicators found within the hauling machine 104, experience of the operator or other methods to deposit the estimated amount of the material 108.

Even though a material plant 102 may include one or more control buildings, operator stations, or other stations 142 for use by material plant personnel, in some examples, a material plant 102 may not be of the type of plant or include the infrastructure to provide for the weighing of material that is taken from or deposited at the material plant 102. Thus, as described herein, the station 142 of the material plant 102 may be used generally for material acquisition or material deposition where exact amounts of material in volume and/or mass are not determined but are instead estimated.

In the examples described herein and as shown in phantom in FIG. 1, one or more such stations 142 may include a material plant controller 144 that is substantially similar to and/or the same as the system controller 122 described above. In some examples, the material plant controller 144 may comprise a component of the control system 120. In any of the examples described herein, the material plant controller 144 and/or other components of the material plant 102 may be configured to monitor, record, and/or communicate activities of the various hauling machines 104 entering and leaving the material plant 102. For example, the various sensors of the material plant 102 and/or the material plant controller 144 may monitor, sense, determine, record, and/or transmit information indicative of a time at which a particular hauling machine 104 enters the material plant 102, a time at which the hauling machine 104 leaves the material plant 102, the amount of material 108 loaded into the particular departing hauling machine 104, the destination of the particular hauling machine 104 (e.g., the location of the worksite 112) the operator of the hauling machine 104, and/or other information. Such information may be used by, for example, the system controller 122 in any of the arrival time determinations, determination of exact or estimated volumes and/or masses of material 108 acquired or deposited, billing associated with at least one of a cost of the material and a cost of a hauling of the material, and/or other operations described herein.

In some examples, further information associated with a hauling machine 104 may be collected while the particular hauling machine 104 is disposed at the material plant 102. For instance, each of the hauling machines 104 may have a unique license plate number, a unique machine identification number, a radio frequency identification (RFID) tag, and/or other hauling machine identifier that is unique to the respective hauling machine 104. In such examples, a hauling machine identifier unique to the respective hauling machine 104 may be scanned, observed, and/or otherwise determined by the sensor 140 while the hauling machine 104 is disposed at the load station 136. Additionally or alternatively, the hauling machine identifier unique to the respective hauling machine 104 may be scanned, observed, and/or otherwise determined by one or more sensors associated with the station 142 when the hauling machine 104 is disposed at the station 142. Additionally or alternatively, material plant personnel may scan, observe, and/or otherwise determine the hauling machine identifier unique to the respective hauling machine 104 using one or more hand-held scanners, sensors, or other devices when the hauling machine 104 is disposed at the load station 136, the station 142, and/or at other locations within the material plant 102. In any such examples, the sensors, hand-held scanners, or other devices described above may provide the determined hauling machine identifier to the material plant controller 144, together with a time stamp indicating the time at which the hauling machine identifier was determined, in one or more signals transmitted via the network 124.

As noted above, the hauling machines 104 of the system 100 may be operable to transport material 108 between the material plant 102 and one or more of the paving machines 106 or dump sites located at the worksite 112. Each of the hauling machines 104 may include a chassis 146 that supports a prime mover, such as an engine, and a cab 148 in which an operator may be positioned to provide input instructions to operate the hauling machine 104. The engine is operatively connected to and drives a ground engaging drive mechanism such as wheels. A material transport unit such as the dump body 150 is pivotally mounted on the chassis 146 and receives a payload (e.g., material 108) to be hauled from one location to another.

Each of the hauling machines 104 used within the system 100 may include a machine control system 152 and a hauling machine controller 154 generally similar or identical to the control system 120 and the system controller 122, respectively. The machine control system 152 and the hauling machine controller 154 may be located on a respective one of the hauling machines 104 and may also include components located remotely from the respective one of the hauling machines 104 such as on any of the other machines of the system 100, at the material plant 102, or at a command center (not shown). The functionality of the hauling machine controller 154 may be distributed so that certain functions are performed on the respective one of the hauling machines 104 and other functions are performed remotely. In some examples, the machine control system 152 and/or the hauling machine controller 154 may enable autonomous and/or semi-autonomous control of the respective one of the hauling machines 104.

The hauling machine 104 may also be equipped with a plurality of sensors connected to and/or otherwise in communication with the hauling machine controller 154 and/or with the system controller 122. Such sensors may be configured to provide data indicative (directly or indirectly) of various operating parameters of the respective one of the hauling machines 104, systems associated with the respective one of the hauling machines 104, and/or the worksite 112 and/or other environment in which the respective one of the hauling machines 104 is operating. In any of the examples described herein, such sensors may comprise components of the machine control system 152, the control system 120, and/or the system 100, generally.

For example, as noted above, each of the hauling machines 104 may be equipped with a location sensor 130 as described above. The location sensor 130 may be configured to sense, detect, and/or otherwise determine a location, speed, heading, and/or orientation of the respective machine including of a respective one of the hauling machines 104. The location sensor 130 may include a plurality of individual sensors that cooperate to generate and provide location signals to the hauling machine controller 154 and/or to the system controller 122 indicative of the location and/or orientation of a respective one of the hauling machines 104. In some examples, the location sensor 130 may be fixed to the cab 148, the chassis 146, and/or any other component of the hauling machine 104. In other examples, however, the location sensor 130 may be removably attached to a respective one of the hauling machines 104 and/or disposed within, for example, the cab 148 of a hauling machine 104 during operation of the hauling machine 104. As noted above, and as will be described below, in some examples one or more of the hauling machines 104 (e.g., the hauling machine 104) may have a location sensor 130 that is missing or that is faulty. In such examples, the system controller 122, the material plant controller 144, the hauling machine controller 154, and/or other components of the control system 120 may identify the particular hauling machine 104 as having a location sensor 130 that is one of missing and faulty. For example, the system controller 122 and/or other components of the control system 120 may identify the hauling machine 104 as having a location sensor 130 that is either missing or faulty based at least in part on determining that when at least one signal is not received from the location sensor 130 while the hauling machine 104 is disposed at the material plant 102, that the hauling machine 104 is disposed at the material plant 102. In such examples, the system controller 122 may determine that the hauling machine 104 is disposed at the material plant 102. The system controller 122 may make this determination based on one or more signals received from the sensor 140 while the hauling machine 104 is disposed at the load station 136, a sensor (not shown) associated with the station 142, one or more signals received from a handheld scanner, sensors, or other device of plant personnel, and/or other signals received from various other material plant sensors (e.g., proximity sensors, geofences/geofence sensors, location sensors, etc.) when the hauling machine 104 is disposed at the load station 136, the station 142, and/or at other locations within the material plant 102.

In some examples, each of the hauling machines 104 may also include a load sensor 156 configured to sense, measure, and/or otherwise determine the load indicating an amount of material 108 disposed within the dump body 150. As described herein, the material plant 102 may not include infrastructure or elements that allow for the weighing of the hauling machines 104 as they acquire or dump the material 108. In these examples, the material plant 102 may provide an amount of material 108 based on the payload capacity of the hauling machine 104 or the volume of the dump body 150 of the hauling machine 104. An estimate may then be obtained as to how much material 108 the material plant 102 dispensed to or received from the hauling machine 108. This estimation may be used in situations where the material plant 102 does not include a set of scales or other mass sensors configured to determine the weight of the hauling machine 104 upon entering the load station 136, the weight of the hauling machine 104 after material 108 has been loaded into the hauling machine 104, and/or a change in weight of the hauling machine 104.

In one example, the system controller 122 and/or the hauling machine controller 154 of the hauling machine 104 may receive sensed data from the load sensor 156 to determine an exact amount of material 108 hauled by the hauling machine 104. In this manner, an exact amount and, consequently, cost of the material 108 may be obtained while still allowing for an approximate value of the material to be obtained from the estimation made at the and by the material plant 102.

Further, the estimation of how much material 108 has been hauled by the hauling machine 104 may be used by the system controller 122 and/or the hauling machine controller 154 to determine a degree of completion of a material transport operation being performed by the hauling machine 104. In this example, the system controller 122 and/or the hauling machine controller 154 may receive information from the material plant 102 as described herein including an estimate of the amount of material 108 provided to the hauling machine 104 based on the payload of the hauling machine 104 and/or the volume of the dump body 150 of the hauling machine 104. In these examples, the estimate may be displayed in the user interface 133 displayed on, for example, the electronic device 128, the system controller 122, a display provided within the hauling machine 104, or display devices and combinations thereof. Further, the system controller 122 and/or the hauling machine controller 154 may receive information regarding the progress of the hauling machine(s) 104 such as a degree of completion of a material transport operation such that the volume or mass of the material 108 intended to be transported in each load as well as a total amount of material 108 may be compared to the actual volume or mass of the material 108 hauled thus far. The progress of the material transport operation may be measured by the number of trips made between a first area where a material may be obtained by the hauling machine(s) 104, and a second area where the hauling machine(s) 104 may dump the material 108, the position of the hauling machines 104 between these two areas. Thus, the progress of a material transport operation may be measured by an estimated amount of material 108 hauled as well as the position and movement of the hauling machines 104. The degree of completion of the material transport operation may be presented to a user via a display device as described herein.

With continued reference to FIG. 1, the paving machine 106, when present in the system 100, may include a frame 160 having a set of ground engaging wheels or tracks 162 mounted thereto, as well as a screed 164 for spreading material 108 across a width of the work surface 110. The paving machine 106 may further include a hopper 166 for storing material 108 supplied by the hauling machines 104 or another supply machine, and a conveyor system which transfers material 108 from the hopper 166 to the screed 164. The paving machine 106 may further include an operator console having a display 168, such as an LCD display. The display 168 may be mounted to the frame 160 for viewing by an operator. In an example embodiment, the display 168 may be configured to display the user interface 133 described herein. As described in more detail below, an example user interface 133 may include, among other things, visual indicia of the material plant 102, visual indicia of the worksite 112, and/or identifiers associated with one or more of the respective hauling machines 104. An example user interface 133 may, additionally or alternatively, include information indicative of an arrival time of one or more of the hauling machines 104. For example, the user interface 133 may provide an indication of the time remaining (hours, minutes, seconds, etc.) until a next one of the hauling machines 104 is expected to arrive at the worksite 112. In other examples, the user interface 133 may provide an indication of the time of day (e.g., 10:32 am) at which a next one of the hauling machines 104 is expected to arrive at the worksite 112.

In still further examples, the user interface 133 may include a map of the worksite 112 including icons or other visual indicia representing the work surface 110, the paving machine 106, one or more of the hauling machines 104, and/or other components of the system 100. The user interface 133 may also include a map of the area surrounding the worksite 112. For instance, such a map may include lines, icons, markers, or other visual indicia representing the material plant 102, the worksite 112, the travel path 114 extending from the material plant 102 to the worksite 112, one or more of the hauling machines 104 disposed on the travel path 114, one or more additional roads, or other items. In additional examples, the user interface 133 may include information associated with a respective one of the hauling machines 104, material information, and/or other information that may be included in a ticket generated at the material plant 102. Further, the user interface 133 may include information associated with the detected degree of completion of the material transport operations performed by the hauling machine 104. Still further, the user interfaces 133 described herein may be displayed via the display 168, the electronic device 128, and/or via any other displays associated with the system controller 122, the material plant controller 144, or other components of the control system 120.

The paving machine 106 may also include a paving machine control system 170 and a paving machine controller 172 generally similar or identical to the control system 120 and the system controller 122, respectively. The paving machine control system 170 and the paving machine controller 172 may be located on the paving machine 106 and may also include components located remotely from the paving machine 106 such as on any of the other machines of the system 100, the system controller 122, at the material plant 102, or at a command center (not shown). The functionality of paving machine controller 172 may be distributed so that certain functions are performed on the paving machine 106 and other functions are performed remotely. In some examples, the paving machine control system 170 and/or the paving machine controller 172 may enable autonomous and/or semi-autonomous control of the paving machine 106. For example, the paving machine controller 172 may be configured to receive one or more hauling machine arrival times from the system controller 122. In an autonomous or semi-autonomous mode of operation, the paving machine controller 172 and/or the paving machine control system 170, generally, may be operable to cause the paving machine 106 to travel at a desired paving machine speed while depositing material 108 on the work surface 110 based at least in part on the received arrival time. Such operation and/or control of the paving machine 106 may minimize and/or eliminate paving machine stoppages.

The paving machine 106 may also be equipped with a plurality of sensors connected to and/or otherwise in communication with the paving machine controller 172 and/or with the system controller 122. Such sensors may be configured to provide data indicative (directly or indirectly) of various operating parameters of the paving machine 106, systems associated with the paving machine 106, and/or the worksite 112, and/or other environments in which the paving machine 106 is operating. In any of the examples described herein, such sensors may comprise components of the paving machine control system 170, the control system 120, and/or the system 100, generally. For example, the sensors may include the location sensor 130 and communication device 126 described above.

Figure 2:
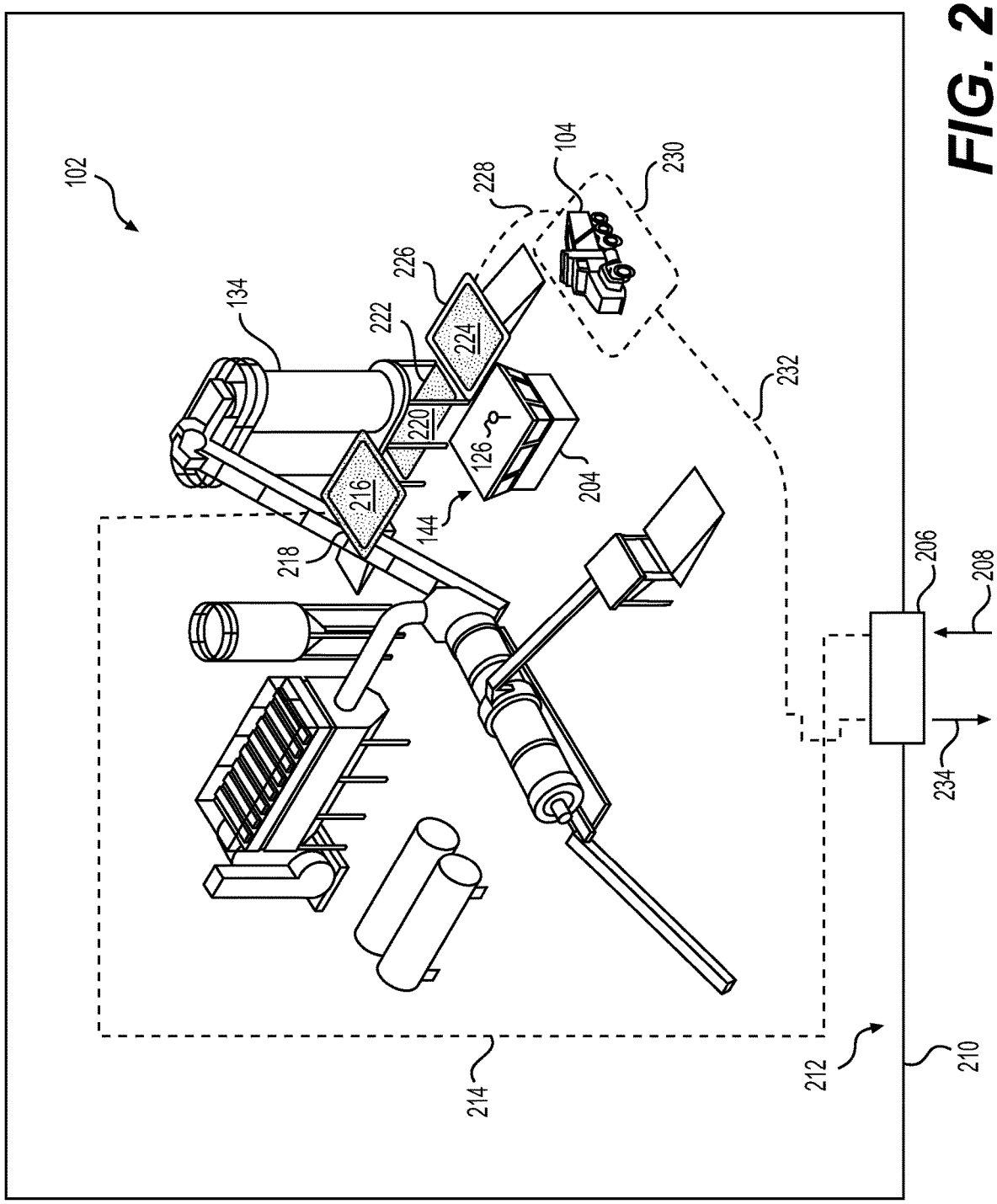
FIG. 2 is a schematic illustration of a material plant in accordance with an example embodiment of the present disclosure.

FIG. 2 illustrates an example material plant 102 in further detail. As shown in FIG. 2, one or more components of the material plant 102 may be housed in and/or otherwise located at the control building 204. For example, in some embodiments the material plant controller 144 may be located within the control building 204. Additionally, a receiver, transmitter, transceiver, and/or one or more other components of the wireless communication system 126 may be located at the control building 204. Such components may be configured to receive one or more signals from and/or send one or more signals to, for example, various location sensors 126 (FIG. 1) disposed on or in one or more of the hauling machines 104. Such components of the wireless communication system 126 may also be configured to receive one or more signals from and/or send one or more signals to, for example, various sensors including volume and/or weight sensors 138, loading sensors 140, load sensors 156, among other sensors, and/or other wireless communication systems or components.

The material plant 102 may include one or more gates 206, and such gates 206 may include respective entrances and/or exits to the material plant 102. The gates 206 may, for example, be configured to permit passage of a hauling machine 104 into the material plant 102 in the direction 208. In any of the examples described herein, one or more components of the material plant 102 may be configured to sense, detect, and/or otherwise determine passage of the hauling machine 104 through the gate 206, and such components may also be configured to determine whether the hauling machine 104 is located within the material plant 102. For example, the material plant 102 may include one or more geofences configured to assist in determining the location of a hauling machine 104. In example embodiments, a geofence may comprise, for example, a virtual geographic boundary defined by GPS, cellular, near-field communication, radio frequency identification (RFID), and/or other components of the material plant 102. Such geofences may enable the material plant controller 144, software operable on the material plant controller 144, and/or other components of the material plant 102 to generate a signal or other response when a location sensor 130 carried by a hauling machine 104 enters or leaves the virtual geographic boundary of the geofence. In some examples, the respective location sensors 130 may emit signals continuously, substantially continuously, or at predetermined intervals (e.g., every second, every two seconds, every five seconds, every ten seconds, every 15 seconds, etc.), and such signals may include information indicating the location of the hauling machine 104 within which the location sensor 130 is disposed. In such examples, the material plant controller 144 may be configured to determine whether the location sensor 130 and, thus, the hauling machine 104 is located within one or more geofences of the material plant 102 based at least partly on such signals.

As shown in FIG. 2, the material plant 102 may include a geofence 210 extending substantially along and/or otherwise substantially overlaying a perimeter 212 of the material plant 102. The geofence 210 may, thus, correspond to an outer boundary of the material plant 102, and a hauling machine 104 may pass into the geofence 210 when entering the material plant 102 via the gate 206. Upon entering the material plant 102 via the gate 206, a hauling machine 104 may travel along a path 214 extending between the gate 206 and a location 216 within the perimeter 212 of the material plant 102 corresponding to one or more holding locations. For example, the location 216 may comprise an entrance to the material silo 134 at the material plant 102. In these examples, the material plant 102 may also include a geofence 218 extending substantially along and/or otherwise substantially overlaying a perimeter or outer boundary of the location 216. The geofence 218 may define a virtual boundary of the location 216, and the location 216 may be within the geofence 218 as depicted in FIG. 2 as a shaded area. It is understood that a hauling machine 104 may be located at location 216 and thus, within the geofence 218, before entering a loading area of the material silo 134 disposed adjacent to the entrance.

For example, a location 220 substantially beneath the material silo 134 may include a loading area of the material silo 134 at which the hauling machine 104 may receive material 108 into the dump body 150. In such examples, the material plant 102 may further include a geofence 222 extending substantially along and/or otherwise substantially overlaying a perimeter of the location 220. For example, the geofence 222 (as depicted in FIG. 2 as a shaded area) may define a virtual boundary of the location 220, and the location 220 may be within the geofence 222. Additionally, the geofence 218 may be disposed adjacent to the geofence 222. Further, a location 224 adjacent to the location 220 may comprise an exit of the material silo 134 at which the hauling machine 104 may be weighed, observed, and/or otherwise evaluated. As shown in FIG. 2, in some examples, the material plant 102 may also include a geofence 226 extending substantially along and/or otherwise substantially overlaying a perimeter of the location 224 as depicted in FIG. 2 as a shaded area. For example, the geofence 226 may define a virtual boundary of the location 224, and the location 224 may be within the geofence 226. In these examples, the geofence 222 may be disposed adjacent to the geofence 226.

In some examples, upon exiting the location 224 a hauling machine 104 may travel along a path 228 extending between the location 224 and a location 230 proximate the control building 204. In such examples, the hauling machine 104 may temporarily stop at the location 230, such that an operator of the hauling machine 104 may receive a material ticket associated with the material 108 received at the material silo 134. In some examples, the material ticket may include a text file, an image file, a data file, and/or any other digital or electronic file configured to contain information, and to be executed and/or otherwise consumed by a server, a computer, a mobile phone, and/or other electronic device. Further the material ticket may be saved within a memory connected to the material plant controller 144 and may be transmitted to one or more additional electronic devices (e.g., the system controller 122, the electronic device 128, an electronic device carried by the operator of the hauling machine 104, the hauling machine controller 154, etc.) via, for example, the wireless communication system 126. Additionally or alternatively, such a material ticket may include a physical card, ticket, piece of paper, or other physical object including any of the information described herein and configured for consumption by a human. Further, the material ticket may be printed on a printer or other device connected to the material plant controller 144.

An example material ticket may include information indicating an estimated weight, volume, composition, temperature, and/or other characteristics of the material 108 deposited into the dump body 150 at the location 220. As described herein, in some examples the material plant 102 may not participate in or include hardware and/or software infrastructure to support a ticketing system including scales or other sensors to detect an exact characteristic of the material 108 deposited into the dump body 150 of the hauling machine 104. Thus, an estimate of, for example, a weight, volume, composition, temperature, and/or other characteristics of the material 108 may be provided to the system controller 122 or other processing devices and systems described herein. Despite the ability to obtain an estimate of these characteristics of the material 108 rather than exact, sensed characteristics, the system 100 described herein provides for the determination of a degree of completion of a material transport provided by the hauling machine 104 and based on the estimated values so that users, operators, supervisors, and others may know how the material transport operations are progressing. The system 100 may use the estimated amount of material 108 hauled by the hauling machines 104 to estimate a level or degree of completion of the material transport operations, and display an indicator within the user interface 133 to inform a user of that level or degree of completion of the material transport operations.

The material ticket may also include information identifying the worksite 112 at which the material 108 will be utilized. In further examples, the material ticket may also include information uniquely identifying the particular hauling machine 104 receiving the material 108 at the location 220. For example, a plant employee may observe the unique identifier associated with a particular hauling machine 104 during inspection of the hauling machine 104 in at least one of the locations 216, 220, 224 where the hailing machine 104 is staged in a holding location, loaded with material 108, and observed or evaluated, respectively. In such examples, the plant employee may record the unique identifier, and may provide an input to the material plant controller 144 including information indicating the unique identifier. Alternatively, one or more cameras, scanners, RFID readers, near-field communication scanners, barcode readers, or other detection devices may automatically capture and/or otherwise observe the unique identifier during inspection of the hauling machine 104 in at least one of the locations 216, 220, 224. In these examples, the one or more cameras or other detection devices may send a signal to the material plant controller 144 including information indicating the unique identifier. In any of the examples described herein, the material plant controller 144 may generate the material ticket based at least partly on the hauling machine 104 receiving the material 108 at the material silo 134 of the material plant 102, and an example material ticket may include the unique identifier identifying the particular hauling machine 104. Further, any of the material tickets described herein may include a timestamp indicating the date and/or time at which the material ticket was generated.

Upon receiving the material ticket at the location 230, at another location, or via data transfer (in the case of an electronic material ticket), the hauling machine 104 may travel from the location 230 to the gate 206 via a path 232. Upon reaching the gate 206, the haul machine 204 may pass through the gate 206 in order to exit the material plant 102 and deliver the material to the dump site or paving machine 106. In particular, the hauling machine 104 may pass through the gate 206 in the direction 234. By passing through the gate 206 in the direction 234, the hauling machine 104 may also exit the geofence 210 corresponding to the perimeter 212 of the material plant 102. The hauling machine 104 may then traverse travel path 114 between the dump site or paving machine 106 and the material plant 102.

Figure 3:
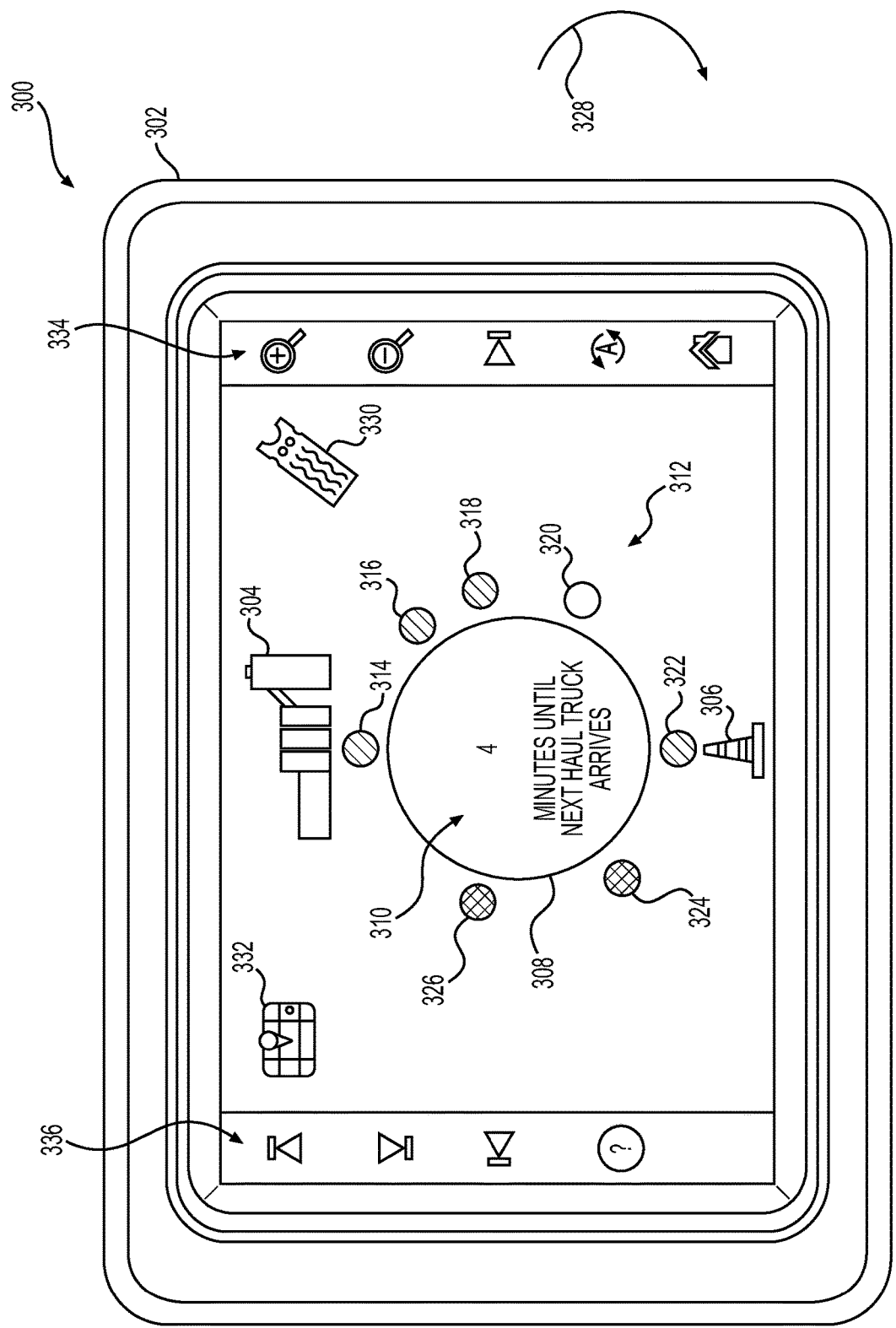
FIG. 3 is an illustration of an example user interface generated by a controller of the system shown in FIGS. 1 and 2.

FIG. 3 illustrates an example user interface 300 of the present disclosure. The user interface 300 of FIG. 3 is an example of the user interface 133 described above with respect to FIG. 1. The example user interface 300 may comprise any of the user interfaces 133 described herein with respect to FIG. 1, and the user interface 300 of FIG. 3 is shown as being displayed on an LCD display, a CRT display, a touch-screen (e.g., a capacitive/touch-sensitive) display device, and/or other display 302. In some examples, the display 302 may include a display of the electronic device 128, a display associated with the system controller 122, a display associated with the material plant controller 144, and/or a display associated with one or more other components of the control system 120. In further examples, the display 302 may include a display of the paving machine 106 that is similar to and/or the same as the display 168 described above with respect to FIG. 1.

As shown in FIG. 3, an example user interface 300 may include images, icons, and/or other visual indicia associated with the material plant 102, the worksite 112, one or more of the hauling machines 104, and/or other components of the system 100. For example, the user interface 300 may include visual indicia 304 associated with, resembling, and/or otherwise indicative of the material plant 102, and visual indicia 306 associated with, resembling, and/or otherwise indicative of the worksite 112. In some examples, the layout, arrangement, visual indicia, and/or other configurations of the user interface 300 may in some ways resemble the physical locations of the one or more components of the system 100 illustrated therein. For example, the visual indicia 304 of the material plant 102 may be disposed in a first portion of the user interface 300, and the visual indicia 306 of the worksite 112 may be disposed in a second portion of the user interface 300 that is spaced from, and/or otherwise separated from the first portion of the user interface 300. Such spacing and/or separation may be indicative of the physical and/or geographic distance between the material plant 102 and the worksite 112. In some examples, the user interface 300 may also include one or more lines, images, icons, and/or other visual indicia (not shown) resembling and/or otherwise indicative of the travel path 114 and/or other visual indicia indicative of the portions 116 and 118, of the travel path 114 extending from the material plant 102 to the worksite 112, and In such examples, the length, shape, orientation, location on the user interface 300, and/or other configurations of such visual indicia may be indicative of the contours, distances, and/or other physical, and/or geographic configurations of the travel path 114.

The user interface 300 may also include at least one section, portion, window 308, configured to provide information 310 associated with operations at the worksite 112, operations at the material plant 102, and/or any other information associated with various components of the system 100. For example, in any of the embodiments described herein, the user interface 300 may provide information 310 indicative of an arrival time at which at least one of the hauling machines 104 is expected to arrive at the worksite 112. As shown in FIG. 3, in some examples the user interface 300 may provide information 310 indicating the time remaining (hours, minutes, seconds, etc.) until a next one of the hauling machines 104 is expected to arrive at the worksite 112. In other examples, the user interface 300 may provide information 310 indicating the time of day at which a next one of the hauling machines 104 is expected to arrive at the worksite 112. In still further examples, such information 310 may be provided by the user interface 300 in any other additional ways or configurations.

In some examples, the user interface 300 may also include one or more lines, dots, images, icons, and/or other visual indicia 312 resembling and/or otherwise indicative of one or more of the hauling machines 104 associated with the system 100. For example, as shown in FIG. 3 and with reference to the example system 100 described herein with respect to FIG. 1, the visual indicia 312 included in the user interface 300 may include, among other things, an identifier 314 associated with, corresponding to, and/or otherwise indicative of the hauling machine 104 disposed at the material plant 102. The visual indicia may also include an identifier 316 associated with, corresponding to, and/or otherwise indicative of a hauling machine 104 traversing the portion 116 of the travel path 114 ahead of the hauling machine 104. Further, the visual indicia may include an identifier 318 associated with, corresponding to, and/or otherwise indicative of a hauling machine 104 traversing the portion 116 of the travel path 114 ahead of another hauling machine 104. Still further, the visual indicia may include an identifier 320 associated with, corresponding to, and/or otherwise indicative of a hauling machine 104 traversing the portion 116 of the travel path 114 ahead of another hauling machine 104. Even still further, the visual indicia may include an identifier 322 associated with, corresponding to, and/or otherwise indicative of the hauling machine 104 disposed at the worksite 112. In such examples, the visual indicia 312 may be associated with, correspond to, and/or may otherwise be indicative of a plurality of hauling machines 104 traveling sequentially (e.g., in series, one after another) from the material plant 102 to the worksite 112 along the portion 116 of the travel path 114.

As shown in FIG. 3 and with reference to the example system 100 described herein with respect to FIG. 1, the visual indicia 312 included in the user interface 300 may include an identifier 324 associated with, a hauling machine 104 traversing the portion 118 of the travel path 114 positioned ahead of another hauling machine 104 (e.g., returning to the material plant 102 from the worksite 112), and an identifier 326 associated with, a hauling machine 104 traversing the portion 118 of the travel path 114 ahead of another hauling machine 104 such as, for example, the hauling machine 104 associated with identifier 324.

The visual indicia 312 illustrated in FIG. 3 are shown as dots, circles, and/or other icons. In additional examples, the visual indicia 312 may be shaped, sized, and/or otherwise configured to resemble the corresponding hauling machines 104. Additionally, in any of the examples described herein, each of the visual indicia 312 included in the user interface 300 may be shaped, sized, colored, patterns, shaded, hatched, positioned, and/or otherwise configured to provide additional information associated with a corresponding one of the hauling machines 104. For example, each of the identifiers 314, 316, 318, 322 may be colored, patterned, shaded, hatched, and/or otherwise displayed with a first configuration (e.g., shown as a first hatched pattern in FIG. 3) to indicate that hauling machines 104 corresponding to each of the respective identifiers 314, 316, 318, 322 are currently loaded with material 108. Similarly, each of the identifiers 324, 326 may be colored, patterned, shaded, hatched, and/or otherwise displayed with a second configuration (e.g., shown as a second hatched pattern in FIG. 3 different from the first hatched pattern) to indicate that hauling machines 104 corresponding to each of the respective identifiers 324, 326 are currently not loaded with material 108. It is also understood that the identifier 320 may be colored, patterned, shaded, hatched, and/or otherwise displayed with a third configuration (e.g., shown without a hatched pattern in FIG. 3) to indicate that the hauling machine 104 corresponding to the identifier 320 includes a location sensor 130 that is one of missing and faulty.

In such examples, the identifier 320 may also be displayed with one or more additional colors, patterns, shades, hatchings, and/or other configurations to indicate whether the hauling machine 104 corresponding to the identifier 320 is currently loaded with material 108, whether the hauling machine 104 is currently not loaded with material 108 or the hauling machine 104 is in some other state or situation. Similarly, in such examples the identifiers 314, 316, 318, 322, 324, 326 may be displayed with one or more additional colors, patterns, shades, hatchings, and/or other configurations to indicate whether the respective hauling machines 104 corresponding to the identifiers 314, 316, 318, 322, 324, 326 include a functional location sensor 130.

Moreover, in some examples, the position, orientation, and/or other configurations of the visual indicia 312 may be representative of, associated with, and/or otherwise indicative of the locations of the respective hauling machines 104. For example, in some embodiments, the identifiers 314, 316, 318, 320, 322, 324 and 326 (referred to herein collectively as 314) may be positioned on the user interface 300, at locations between the visual indicia 304 and the visual indicia 306, indicative of substantially real-time locations of the respective hauling machines 104 corresponding to the identifiers 314. Such substantially real-time locations of the hauling machines 104 may include, for example, locations of the hauling machines 104 along the portions 116 and 118 of the travel path 114 extending from the worksite 112 to the material plant 102.

Further, in some examples, the position, orientation, and/or other configurations of the visual indicia 312 may be representative of, associated with, and/or otherwise indicative of the determined arrival times of the respective hauling machines 104. For example, in some embodiments, the identifiers 314, 316, 318, 320, 322 may be positioned on the user interface 300, at locations between the visual indicia 304 and the visual indicia 306, indicative of determined arrival times at which the respective hauling machines 104 corresponding to the identifiers 314, 316, 318, 320, 322 are expected to arrive at the worksite 112. Similarly, the identifiers 324, 326 may be positioned on the user interface 300, at locations between the visual indicia 306 and the visual indicia 304, indicative of determined arrival times at which the respective hauling machines 104 corresponding to the identifiers 324, 326 are expected to arrive at the material plant 102. For example, FIG. 3 illustrates the identifier 322 associated with a hauling machine disposed closer to the visual indicia 306 associated with the worksite 112 than the identifier 320 associated with the hauling machine 104. The user interface 300 of FIG. 3 also illustrates the identifier 322 associated with a hauling machine 104 disposed between the identifier 324 and the identifier 320, in the direction of travel 328 of the hauling machines. In any of the examples described herein, the positions, orientations, colors, patterns, shades, hatchings, and/or other configurations of the identifiers 314 (e.g., the visual indicia 312) may be dynamic, and/or may be updated in substantially real-time. For example, in some embodiments the identifiers 314 may be displayed in the user interface 300 as moving objects, traveling between the visual indicia 304 and the visual indicia 306, in the direction of arrow 328. In this way, the visual indicia 312 of the user interface 300 may be indicative of a plurality of hauling machines 104 traveling sequentially (e.g., in series, one after another) between the machine plant 103 and the worksite 112 along the travel path 114. This provides a user with the ability to visually determine the progress of a material transfer operation performed by the hauling machines.

In any of the example embodiments described herein, the user interface 300 may comprise an interactive user interface configured to receive one or more inputs from a user via the display 302, and to provide one or more outputs via the display 302 corresponding to such inputs. In such examples, one or more of the visual indicia 304, 306, 312 described herein may be configured to receive one or more inputs from a user via the display 302, and to provide various information and/or other outputs via the display 302 corresponding to such inputs. The user interface 300 may also include one or more dedicated controls configured to receive inputs via the display 302. As shown in FIG. 3, the user interface 300 may include, for example, a control 330 configured to receive an input from the user. In response to receiving such an input, the user interface 300 may provide, display, and/or otherwise output, via the display 302, various information typically associated with a paving ticket, with the material plant 102, with the worksite 112, and/or with various components of the system 100. For example, as will be described in greater detail below with respect to FIG. 4, selecting the control 330 via the display 302 may, either alone or in combination with an additional selection of one of the visual indicia 312, cause information associated with a material ticket (and associated with a respective one of the hauling machines 104 corresponding to the selected one of the visual indicia 312) to be displayed via the display 302.

As shown in FIG. 3, the user interface 300 may further include, for example, a control 332 configured to receive an input from the user. In response to receiving such an input, the user interface 300 may provide, display, and/or otherwise output, via the display 302, a map including visual indicia indicative of the material plant 102, the worksite 112, the travel path 114, one or more of the hauling machines 104, and/or various other components of the system 100. For example, as will be described in greater detail below with respect to FIG. 4, selecting the control 332 via the display 302 may cause at least part of such a map to be displayed via the display 302. The user interface 300 may also include various other controls 334, 336 configured to operate, access, and/or control various other features of the user interface 300 and/or various other operations of the paving system component with which the display 302 is associated.

Figure 4:
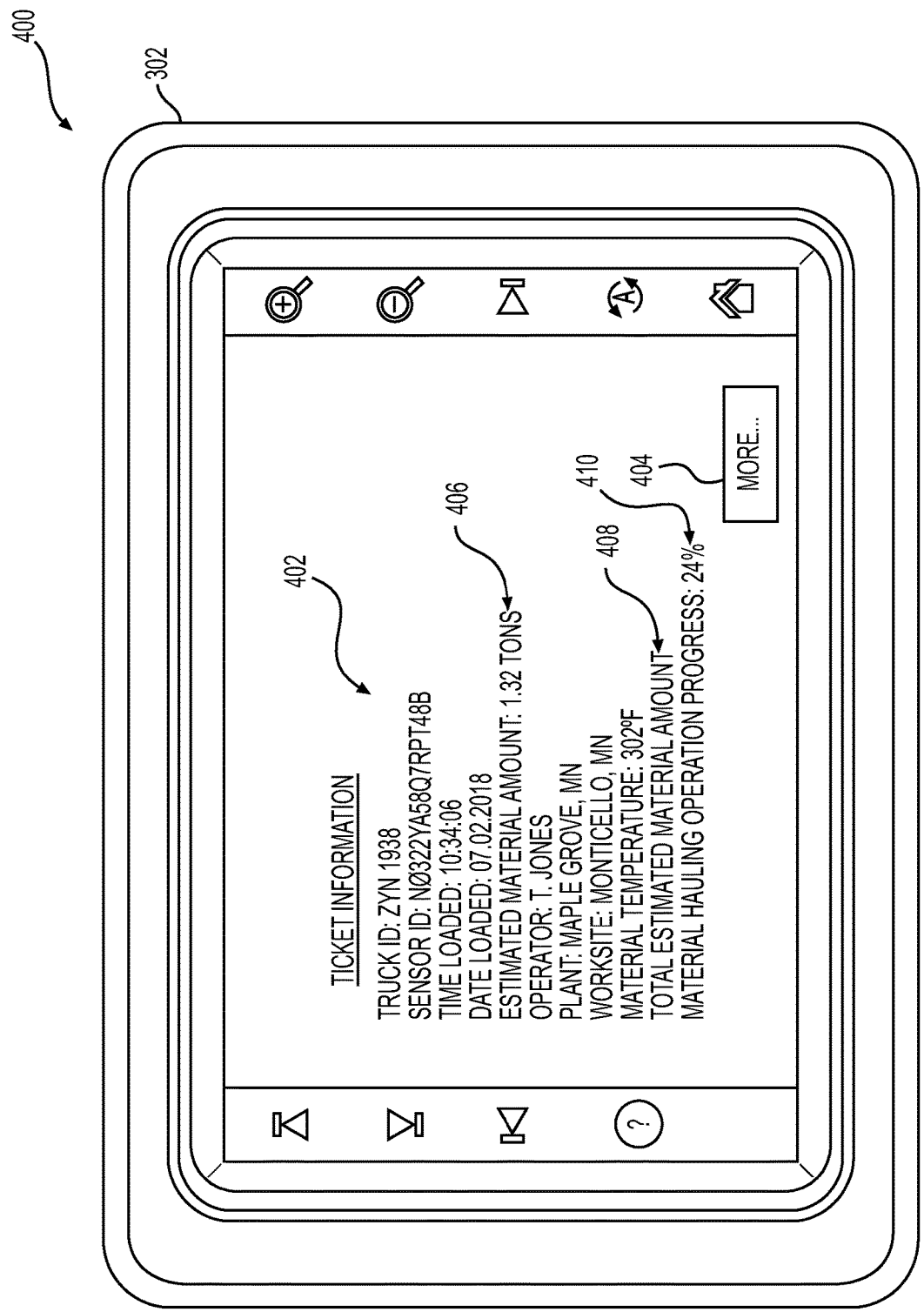
FIG. 4 is an illustration of another example user interface generated by the controller of the paving system shown in FIGS. 1 and 2.

FIG. 4 illustrates another example user interface 400 of the present disclosure provided by the display 302. Like the user interface 300 of FIG. 3, the user interface 400 of FIG. 4 is an example of the user interface 133 of FIG. 1. For example, as noted above, such a user interface 400 may be provided by the display 302 at least partly in response to receipt of an input via the control 330 (shown in FIG. 3). In some examples, such a user interface 400 may be provided by the display 302 at least partly in response to the receipt of a first input via the control 330, and at least partly in response to the receipt of a second input via one of the identifiers 314. In such examples, the user interface 300 may include information 402 associated with at least one of the hauling machines 104 corresponding to the respective one of the identifiers 314 via which the second input described above is received. For example, such information 402 may include, among other things, information that may be included in a material ticket issued by the material plant 102 before, during, and/or after the one of the hauling machines 104 is loaded with material 108. In some examples, such information 402 may include, among other things, a hauling machine identifier (shown as a "Truck ID" in FIG. 4) that is unique to the one of the hauling machines 104, and a location sensor identifier (shown as a "Sensor ID" in FIG. 4) that is unique to the particular location sensor 130 disposed in, connected to, and/or otherwise associated with the one of the hauling machines 104. The information 402 may also include a time at which the one of the hauling machines 104 was loaded with material 108 at the material plant 102, and a date at which the one of the hauling machines 104 was loaded with material 108 at the material plant 102. Further, the information 402 may include an amount of material 108 (e.g., an estimated weight or volume) that was loaded into the one of the hauling machines 104 at the material plant 102 designated as "ESTIMATED MATERIAL AMOUNT: 1.32 TONS," and the name of an operator of the one of the hauling machines 104. Still further the information 402 may include a name, location, and/or other information indicative of the particular material plant 102 associated with the system 100, and a name, location, and/or other information indicative of the worksite 112. Even still further, the information 402 may include a name, location, and/or other information indicative of an entity hauling the material 108 or for whom the material is hauled, and the temperature of the material 108 that was loaded into the one of the hauling machines 104 at the material plant 102. Also, the information 402 may include a job identification number/identifier, and/or any additional information that may be included in a material ticket issued by the material plant 102. The information 402 may include any combination of the above items. In some examples, the user interface 400 may also include at least one additional control 404 configured to receive an input from a user via the display 302, and to provide, for example, additional information via the display 302 in response to such an input.

With reference to FIGS. 1 through 3, the system controller 122, the hauling machine controller 154, the material plant controller 144, the electronic device 128, and/or any other processing device may receive a signal from the location sensor 126 of the hauling machine 104 a continuously, substantially continuously, or at predetermined intervals (e.g., every second, every two seconds, every five seconds, every ten seconds, every 15 seconds, etc.). The signals transmitted between the elements including the material plant 102, the hauling machine 104, the paving machine 106, the system controller 122, the electronic device 128, the GPS satellite 132, and other elements may be accomplished by direct communications of communications through the network 124.

The signal may include first information indicating whether the hauling machine 104 is within a first area within a material transfer site such as the material plant 102 as determined by the location sensor 130. Thus, in the examples described herein, the first information may include position information indicating a position of the hauling machine(s) 104 along a path the hauling machine(s) 104 is/are assigned to traverse between the material plant 102 and a dump site such as the paving machine 106. The first information may include data received from the location sensor 130, GPS data obtained from the GPS satellites 132 and/or UTS, a GNSS, or other location determining device. The first area may include any of the locations 216, 220, 224, 230 and their respective geofences 218, 222, 226 or geolocated positions. Further, the first area may include any area within the geofence 210 extending substantially along and/or otherwise substantially overlaying a perimeter 212 of the material plant 102 including along the paths 214, 228, 232. The location sensor 130 may provide which of these areas the hauling machine 104 is located. This first information provides a user with knowledge as to how acquisition of the material 108 at the material plant 102 is progressing, and may be displayed in the user interface 133 as part of the information 402 displayed in the display 302 in addition to the examples describe herein.

Similarly, the system controller 122, the hauling machine controller 154, the material plant controller 144, the electronic device 128, and/or any other processing device may receive a signal from the location sensor 126 of the hauling machine 104 including second information associated with a travel path 114 the hauling machine 104 is assigned to traverse extending between the material transfer site (e.g., the material plant 102) to a second area within a dump site (e.g., the paving machine 106 or another dump site). This second information, like the first information, provides a user with knowledge as to how transport of the material 108 from the material plant 102 to the dump site is progressing. This second information may be displayed in the user interface 133 as part of the information 402 displayed in the display 302 in addition to the examples describe herein. In one example, the second information may include mapped data representing the travel path 114 of the hauling machine 104 between the material transfer site (e.g., the material plant 102) to a second area within a dump site (e.g., the paving machine 106 or another dump site). In this example, the GPS satellites 132 and/or UTS, a GNSS, or other location determining device may obtain the travel path 114 from previous travel paths taken by the hauling machine 104, and/or a travel path 114 defined by a user or the GPS satellites 132 and/or UTS, a GNSS, or other location determining device.

The at least one signal may also include a payload capacity of the hauling machine 104. The payload capacity may be obtained from information stored in a data storage device associated with the system controller 122, the material plant controller 144, the hauling machine controller 154, and/or another controller described herein. The payload capacity may be stored within a look-up table or other data architecture in the data storage device. Further, the data storage device may include a Truck ID. The Truck ID depicted in FIG. 4 may be associated with additional information defining a characteristic of the hauling machine 104 including the payload capacity such as a volume or weight of a material 108 that may be loaded into the hauling machine 104. As described herein the system 100 including the material plant 102 may deposit an amount of material 108 into the hauling machine 104 that is an estimate of the actual volume or mass of the material 108 actually deposited into the hauling machine 104. This may occur in situations where the material plant 102 does not include scales or other measuring device that may provide an exact amount of material 108 deposited into the hauling machine 104. Thus, the signal may include an estimated volume of the material 108 loaded into the hauling machine 104 based on the payload capacity of the hauling machine 104, and this information (i.e., the estimated material amount 406 depicted in FIG. 4) may be displayed in the user interface 133 as part of the information 402 displayed in the display 302 in addition to the examples describe herein. Further, an aggregate of all the material 104 (i.e., the total estimated material amount 408 depicted in FIG. 4) that has been transported by the hauling machine(s) 104 may be displayed in the user interface 133 as part of the information 402 displayed in the display 302 in addition to the examples describe herein. This information may assist a user in understanding of a degree of completion of a material transport operation such that the volume or mass of the material 108 intended to be transported in each load as well as a total amount of material intended to be transported 108 may be compared to the actual volume or mass of the material 108 hauled thus far.

The system controller 122 (or other controller or processing device) may determine the degree of completion of the material transport operation using an estimated or exact amount of material 108 loaded into the hauling machine(s) 104 at the point of determination of the degree of completion and/or the position of the hauling machine(s) 104 along the travel path 114, 214, 228, 232 and the number of lengths of the travel path 114, 214, 228, 232 the hauling machine(s) 104 has made. This information assists the system controller 122 in determining the progress of and degree of completion of the material transport operation.

In an example where the estimated amount of material 108 is used to assist in determining the degree of completion of the material transport operation, the material plant 102 (without the use of a set of scales or other means of metering a mass or volume of the material that is dispensed into the hauling machine 104) may send data via the communication device 126 defining the estimated amount of material 108 loaded into the hauling machine(s) 104 to the system controller 122. Each time an estimated amount of material 108 loaded into the hauling machine(s) 104 is sent to the system controller 122, the system controller 122 may aggregate the amounts to determine a total estimated amount of material 108 loaded into the hauling machine(s) 104. If the material transport operation calls for a target amount of material 108 to be transported, the system controller 122 may calculate what percentage of the target amount of material 108 is included within the total estimated amount of material 108 loaded into the hauling machine(s) 104 at the time of the determination. This percentage may be displayed on a user display device as described herein such that a user may understand the degree of completion of the material transport operation performed by the hauling machine(s) 104.

In an example where the position of the hauling machine(s) 104 along the travel path 114, 214, 228, 232 and the number of lengths of the travel path 114, 214, 228, 232 the hauling machine(s) 104 are used to assist in determining the degree of completion of the material transport operation, the location sensor(s) 130 of the hauling machine(s) 104 may broadcast the position of the hauling machine(s) 104 along the travel path 114, 214, 228, 232, and the number of times the hauling machine(s) 104 traverses the travel path 114, 214, 228, 232. The communication device(s) 126 of the hauling machine(s) 104 may transmit the data obtained from the location sensor(s) 130 to the system controller 122. The system controller 122 may determine that a number of detected locations of the hauling machine(s) 104 or the number of times the hauling machine(s) 104 traverse the travel path 114, 214, 228, 232 to obtain and dump the material 108 at the material plant 102 and dump site (i.e., the paving machine 106).

As described herein, a ticket such as a physical or electronic ticket may be generated at any time during the process of transporting the material 108 between the material plant 102 and the dump site. The ticket may at least initially include an estimate of the material 108 deposited into the hauling machine 104 and/or at least one of a cost of the material 108 and a cost of a hauling of the material 108. This information provided within the ticket may be associated with the unique identifier uniquely identifying the hauling machine(s) hauling the material 108. In this manner, even though and exact volume or mass of the material 108 may not be initially known and presented within the ticket, an estimate may be provided. Again, the estimate may assist a user in understanding a degree of completion of the material transport operation performed by the hauling machine(s) 104. Further, in one example, the estimated volume or mass of the material 108 may be presented as part of the information 402 displayed within the display 302.

In one example, the load sensor 156 configured to sense, measure, and/or otherwise determine the load or amount of material 108 disposed within the dump body 150 of the hauling machine(s) 104 may be used to amend or update the ticket. In this example, the load sensor 156 may send a sensed load or amount of material 108 to any of the system controller 122 to update the ticket with the exact amount and/or update the volume or mass of the material 108 presented as part of the information 402 displayed within the display 302. In this manner, exact costs associated with at least one of the cost of the material 108 and the cost of a hauling of the material 108 may be obtained from the load sensor 156 and provided within the ticket to provide a user with the exact cost.

Whether the ticket is generated based on the estimated volume or mass of the material 108 or an exact amount of volume or mass of the material 108 as determined by the load sensor 156, the at least one of an operator of the hauling machine(s) 104, an entity hauling the material 108, and an entity for whom the material 108 is hauled may be billed based on the ticket. In some situations, the entity hauling the material 108 may be owned by, for example, a builder, contractor, or developer that is purchasing the material 108. In this example, the builder, contractor, or developer may be billed and an invoice for the material 108 may be issued. Further, in some situations, the entity for whom the material 108 is hauled may be contracting with a material hauling company and/or an owner of the material plant 102. In this example, the entity for whom the material 108 is hauled may be billed and an invoice for the material 108 and/or the transport of the material 108 may be issued. The system controller 122 may generate the ticket by receiving from the material plant 102 (without the use of a set of scales or other means of metering a mass or volume of the material that is dispensed into the hauling machine 104) an estimated volume or mass of the material 108 or from the load sensor 156 of the hauling machine 104 an exact volume or mass of the material 108. This data may be transmitted via the communication devices 126 of the material plant 102 or the hauling machine(s) 104. In this example, the ticket may be generated identifying at least one of the operator of the hauling machine, the entity hauling the material, the entity for whom the material is being hauled, a project for which the material is being provided, an estimated volume of the material loaded into the hauling machine based on the payload capacity of the hauling machine, the exact amount of volume or mass of the material 108 as determined by the load sensor 156, other information, and combinations thereof.

The progress of the material hauling operation including defining a progress of a material hauling task (i.e., the material hauling operation progress 410 depicted in FIG. 4) assigned to the hauling machine(s) 104 may be defined by the system controller 122 and displayed as part of the information 402 displayed within the display 302. In order to do so, the estimated volume or mass of the material or the exact volume or mass of the material 108 as detected by the load sensor 156 may be displayed as part of the information 402 displayed within the display 302. The material hauling task performed by the hauling machine(s) 104 includes at least one hauling instance of the material transport operation. In one example, the information 402 displayed within the display 302 may include detailed information as to a volume or mass of the material 108 that is and/or has been hauled by a first hauling machine 104 so that the user may understand the effectiveness of that first hauling machine 104. In another example, the information 402 displayed within the display 302 may include detailed information as to a volume or mass of the material 108 that is and/or has been hauled by a plurality of the hauling machines 104 individually so that the user may be able to compare the effectiveness of the hauling machines 104 against each other. In still another example, the information 402 displayed within the display 302 may include detailed information as to a volume or mass of the material 108 that is and/or has been hauled by all the hauling machines 104 working within the same material transport task or operation. In this example, the user is able to see an overall level or degree of completion of the material transport operation that is being performed by the hauling machines 104.

Figure 5:
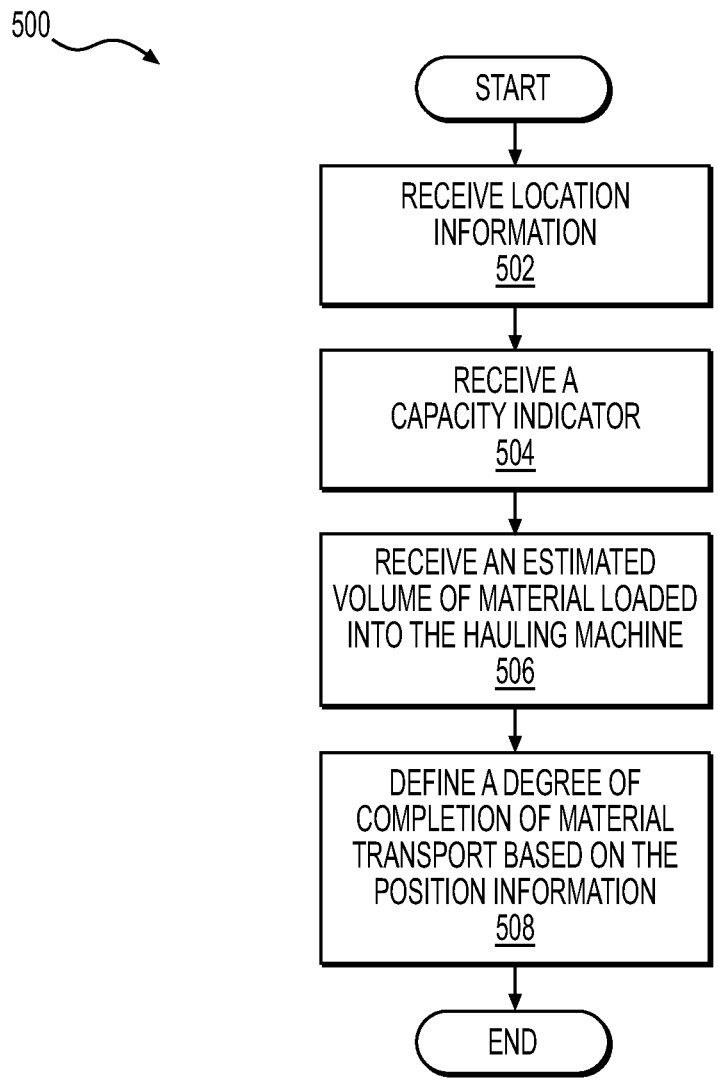
FIG. 5 is a flow chart depicting an example method of tracking a material transport operation shown in FIGS. 1 and 2.

Having described the system 100 and the various functions of its constituent elements, FIG. 5 is a flow chart depicting an example method 500 of tracking a material transport operation. The method 500 of FIG. 5 described herein may be performed by at least one of the system controller 122, the material plant controller 144, hauling machine controller 154, the paving machine controller 172, a controller of the electronic device 128, or other processing devices separately or acting together. However, for ease of description, the method of FIG. 5 will be described with respect to the system controller 122. The method 500 may include, at 502, receiving, with the controller 122, position information indicating a position of the hauling machine 104 along a travel path 114, 214, 228, 232 the hauling machine 104 is assigned to traverse extending between a material transfer site 102 to a dump site (e.g., the paving machine 106). The location sensor 130 may send location data to the system controller 122 to inform the system controller 122 the location of the hauling machine 104 along the travel path 114, 214, 228, 232.

At 504, the system controller 122 may receive a payload capacity of the hauling machine(s) 104. The payload capacity may be obtained from information stored in a data storage device associated with the system controller 122, the material plant controller 144, the hauling machine controller 154, and/or another controller described herein. The payload capacity may be stored within a look-up table or other data architecture in the data storage device. Further, as described herein, the data storage device may include the Truck ID that defines a characteristic of the hauling machine 104 including the payload capacity such as a volume or weight of a material 108 that may be loaded into the hauling machine 104. Thus, in some examples described herein, the signal received by the system controller 122 may further include a unique identifier of the hauling machine 104. The hauling machine 104 or material plant 102 may collect and send this data to the system controller 122. The unique identifier may be associated with at least one of an operator of the hauling machine 104, an entity hauling the material 108, an entity for whom the material 108 is being hauled, and a project for which the material 108 is being provided.

At 506, the system controller 122 may receive an estimated volume of material loaded into the hauling machine 104. The estimate may be received by the material plant 102 sending the estimate of material 108 dispensed into the dump body 150 of the hauling machine 104 via the communication device 126 of the material plant 102.

At 508, the system controller 122 may define a degree of completion of a material transport based on the position information. The system controller 122 may identify a presence of the hauling machine(s) 104 along the travel path 114, 214, 228, 232 and translate that location information as a degree of completion of a material transport performed by the hauling machine(s) 104. Identifying the presence of the hauling machine 104 along the travel path 114, 214, 228, 232 as the degree of completion of the material transport at 508 may include identifying the presence of the hauling machine 104 within the first area as an instance of a loading of material 108 into the hauling machine 104, identifying the presence of the hauling machine 104 along the travel path 114, 214, 228, 232 as an instance of a transport of the material 108, and identifying the presence of the hauling machine 104 within the second area as an instance of a dumping of the material 108 by the hauling machine 104. Further, the location sensor(s) 130 of the hauling machine(s) 104 may send data indicative of the location of the hauling machine(s) 104 via a communication device(s) 126 to the system controller 122 for analysis.

Further, the method 500 may include billing for at least one of a cost of the material 108 and a cost of a hauling of the material 108 based on the unique identifier of each of the hauling machines 104 that participate in the material transport operation or a task included therein. The system controller 122 may generate an invoice by receiving from the material plant 102 and/or the load sensor 156 of the hauling machine 104, or based on the ticket generated by the system controller 122. Again, the data used to generate the invoice may be transmitted via the communication devices 126 of the material plant 102 or the hauling machine(s) 104 or obtained from the system controller 122 itself in the form of the ticket generated by the system controller 122. In this example, the ticket described herein may be generated identifying at least one of the operator of the hauling machine 104, the entity hauling the material 108, the entity for whom the material 108 is being hauled, the project for which the material 108 is being provided, and an estimated volume of the material 108 loaded into the hauling machine 104 based on the payload capacity of the hauling machine 104.

In one example, the method 500 may further include defining a progress of a material hauling task assigned to the hauling machine 104. The system controller 122 may receive input from a user that defines the material hauling task and the travel path 114, 214, 228, 232 or an approximation thereof the hauling machines 104 are to take to complete the material hauling task. In this example, the material hauling task may include at least one hauling instance of the material 108. Further, in one example, the first area may be defined by a first geofence 218. 222. 226 at a loading station of the material transfer site (i.e., the material plant 102). The second area may be defined by a second geofence located at the dump site. In this example, a geofence may be defined around the dump site or the paving machine 106 and may be defined by, for example, a distance from the dump site or the paving machine 106 or a distance from the dump site or the paving machine 106 as identified by the GPS satellite 132. The location data may be sent to the system controller 122 continuously, substantially continuously, or at predetermined intervals (e.g., every second, every two seconds, every five seconds, every ten seconds, every 15 seconds, etc.) to define the presence of the hauling machine(s) 104 along the travel path 114, 214, 228, 232 as depicted in FIGS. 1 and 2, and in the user interface 302 of FIG. 3.

Figure 6:
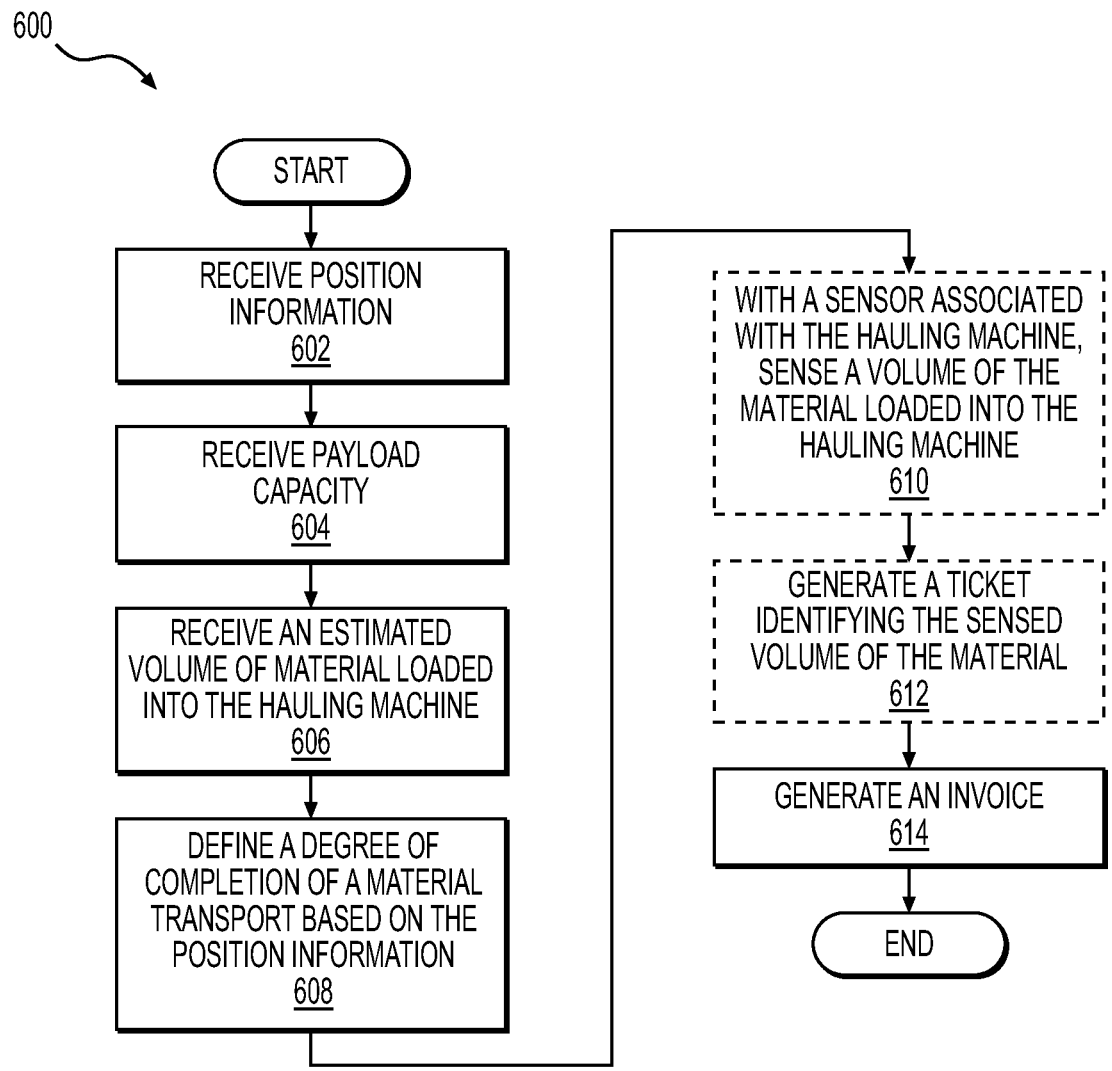
FIG. 6 is a flow chart depicting another example method of tracking a material transport operation shown in FIGS. 1 and 2.

FIG. 6 is a flow chart depicting another example method 600 of tracking a material transport operation. Again, the method 600 of FIG. 6 described herein may be performed by at least one of the system controller 122, the material plant controller 144, hauling machine controller 154, the paving machine controller 172, a controller of the electronic device 128, or other processing devices separately or acting together. However, for ease of description, the method of FIG. 6 will be described with respect to the system controller 122. The method 600 may include, at 602, receiving the position information similar to 502 of FIG. 5. At 604, the system controller 122 may receive a payload capacity of the hauling machine(s) 104 as similarly performed at 504 of FIG. 5. Further, at 606, the system controller 122 may receive an estimated volume of material loaded into the hauling machine 104 as similarly performed at 506 of FIG. 6.

The method 600 may also include defining a degree of completion of a material transport based on the position information at 608 as similarly described above in connection with 508 of FIG. 5.

At 610, the system 100 may optionally sense a volume of the material 108 loaded into the hauling machine 104. The volume of the material 108 may include the volume or the mass and may be detected by, for example, the load sensor 156 configured to sense, measure, and/or otherwise determine the load or amount of material 108 disposed within the dump body 150. At 612, the system 100 may optionally generate a ticket. The ticket may identify the estimated volume of the material 108 received at 608, the load sensor 156, or a combination thereof.

The method 600 may also include, at 614, generating an invoice associated with at least one of the operator of the hauling machine 104, the entity hauling the material 108, the entity for whom the material 108 is being hauled, and the project for which the material 108 is being provided based on the ticket generated at 614.

Figure 7:
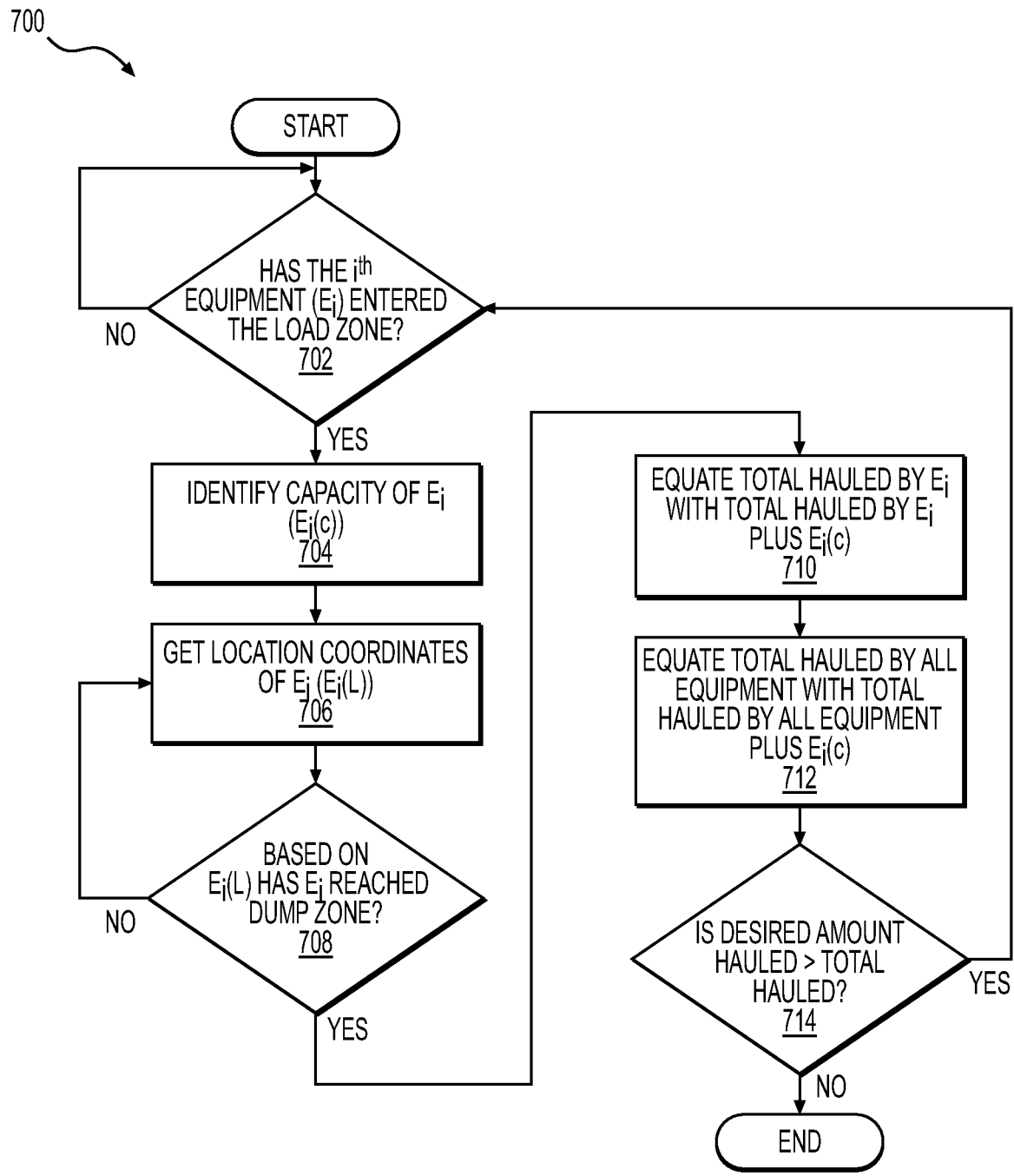
FIG. 7 is a flow chart depicting another example method of tracking a material transport operation shown in FIGS. 1 and 2.

FIG. 7 is a flow chart depicting another example method 700 of tracking a material transport operation shown in FIGS. 1 and 2. The method 700 of FIG. 7 may include determining if the $i^{th}$ equipment ($E_i$) (i.e., the $i^{th}$ hauling machine 104) has entered a load zone such as location 220 substantially beneath the material silo 134. In response to a determination that $E_i$ has not entered the load zone (702, determination NO), the method 700 may loop back to before 702, and the system 100 may continually monitor whether $E_i$ has entered the load zone. However, in response to a determination that $E_i$ has entered the load zone (702, determination YES), the method 700 may include identifying, at 704, a payload capacity of $E_i$ where the payload capacity of $E_i$ may be denoted as $E_i(c)$. The payload capacity $E_i(c)$ is an estimated amount of material the $E_i$ (i.e., the $i^{th}$ hauling machine 104) may carry in a single material transport trip. The location coordinates of $E_i$ (denoted as $E_i(L)$) may be obtained at 706 through for example, the location sensor 130 of $E_i$ relaying data to the system controller 122 or other processing device.

The method 700 may also include determining whether $E_i$ has reached a dump zone (e.g., the location where the paving making 106 is located) based on $E_i(L)$. If $E_i(L)$ indicates that $E_i$ has not reached a dump zone (708, determination NO), the method may loop back to 706 where the system 100 may continually monitor whether $E_i$ has entered the dump zone. However, in response to a determination that $E_i$ has reached a dump zone (708, determination YES), the system controller 122 may or other processing device may equate a total hauled by $E_i$ with a total hauled by $E_i$ plus $E_i(c)$. In this manner, the total material 108 hauled by a single hauling machine 104 may be identified in instances where an estimated amount of material 108 rather than an exact amount may be obtained. The system 100 may, using the system controller 122, equate a total hauled by all equipment E (i.e., all hauling machines 104) with the total hauled by all $E_i$ plus $E_i(c)$. Thus, in this manner, the total material 108 hauled by all the hauling machines 104 participating in the material transport operation may be identified in instances where an estimated amount of material 108 rather than an exact amount may be obtained.

The method 700 may also include determining if the desired amount of material 108 to be hauled is greater than the total hauled by all $E_i$ plus $E_i(c)$. If the desired amount of material 108 to be hauled is greater than the total hauled by all $E_i$ plus $E_i(c)$ (714, determination YES), the method 700 may loop back to 702 where more material 108 may be transported by $E_i$ (i.e., all hauling machines 104). In response to a determination that the desired amount of material 108 to be hauled is less than or equal to the total hauled by all $E_i$ plus $E_i(c)$ (714, determination NO), the material transport operation may be considered complete, and the method may terminate.

INDUSTRIAL APPLICABILITY

The present disclosure describes systems and methods for associating a unique identifier 144 of a hauling machine 104 with a particular location sensor 130 disposed on or within the hauling machine 104 and determining a degree or level of completion of a material transport operation. Further, the present disclosure describes systems and methods for determining a volume or mass of material 108 transported for situations in which an exact volume or mass of the material 108 cannot be obtained, and billing and/or tracking an amount of transported material 108 based on an estimated volume or mass obtained from a material plant 102. Such systems and methods may be used to more efficiently coordinate activities of the hauling machine 104, paving machines 106, and/or other machines or equipment during paving operations. For example, such systems and methods may enable a system controller 122 to determine the location of a particular hauling machine 104 with greater confidence. As a result, the system controller 122 may schedule the pick-up and/or delivery of paving material 108 with improved accuracy, and thus, may maximize efficiency at a paving worksite 112. Additionally, such systems and methods may be used to more accurately manage and account for amounts of the material 108 obtained at the material plant 102, thereby reducing operating costs.

Such systems and methods may also include generating a material ticket that includes information indicating the material 108 loaded into the hauling machine 104 at the material plant 102 and estimates of the volume or mass thereof. For example, as part of such a method the system controller 122, the material plant controller 144, or other controller may cause the material 108 to be loaded into a dump body 150 of the hauling machine 104 at the material silo 134, and the controller may generate a material ticket based at least partly on the hauling machine 104 receiving the material 108 at the material plant 102. In any of the examples described herein, such a material ticket may include the unique identifier identifying the hauling machine 104 with particularity. In some examples, the unique identifier may be directly observed by one or more paving plant employees while the hauling machine 104 is disposed at one or more of the locations 216, 220, 224 described above. Alternatively, one or more cameras, scanners, or other components of the paving plant 102 may directly observe the unique identifier 144 while the hauling machine 104 is disposed at one or more of the locations 216, 220, 224. Further, the systems and methods may include determining whether the first location noted herein is within a geofence that is disposed within the perimeter 212 of the material plant 102. In some examples, determining that the first location is within a geofence disposed within the perimeter 212 of the paving plant 102 may provide a relatively high level of confidence that the location sensor 130 providing the first signal noted above is actually disposed on or within the particular hauling machine 104 identified by the unique identifier included in the paving material ticket. Thus, the controller may associate the unique identifier of the hauling machine 104 with the location sensor 130 in a memory connected to the controller based at least partly on making such a determination. Utilizing such a method may minimize false associations between unique identifiers of haul machines 104 and location sensors 130 disposed on or within the hauling machines 104 caused by human error and other factors. Additionally, the systems and methods may simplify the process of onboarding hauling machines 104 and/or other machines at the material plan 102.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

What is claimed is:
1. A method, comprising:
receiving, using a controller, at least one signal from a communication device associated with a first equipment, the signal including:

location information indicating a position of the first equipment along a travel path the first equipment is assigned to traverse; wherein the travel path extends between a source location to a destination location;

a capacity indicator of the first equipment, and an estimated volume of a material assigned to the first equipment based on the capacity indicator of the first equipment;

determining, responsive to the location information indicating that the position of the first equipment has been at a loading position at the source location and departed the loading position, using the controller, an estimated volume of material loaded into the first equipment;

determining, using a load sensor of the first equipment, with the first equipment being at the source location, a sensed volume of material loaded into the first equipment at the loading position;

outputting, using the controller, an electronic material ticket based on the estimated volume of material loaded into the first equipment and the sensed volume of material loaded into the first equipment, the electronic material ticket including a unique identifier identifying the first equipment and associating the first equipment with the source location and the estimated and sensed volumes of material loaded into the first equipment; and defining, using the controller, a degree of completion of an assignment based on the location information.

2. The method of claim 1, wherein said defining, with the controller, the degree of completion of the material transport based on the location information comprises:

identifying presence of the first equipment within a first area within the source location as an instance of a loading of the material into the first equipment, the first area including the loading position at the source location;

identifying presence of the first equipment along the travel path as an instance of a transport of the material; and identifying presence of the first equipment within a second area within the destination location as an instance of a dumping of the material by the first equipment.

3. The method of claim 1, wherein:

the signal includes the unique identifier the identifies the first equipment, and the unique identifier is associated with at least one of an operator of the first equipment, an entity hauling the material, an entity for whom the material is being hauled, and a project for which the material is being provided.

4. The method of claim 3, further including, with the controller, generating an invoice including an indication of at least one of a cost of the material and a cost of a hauling of the material based on the unique identifier and the electronic material ticket.

5. The method of claim 4, wherein the electronic ticket identifies at least one of the operator of the first equipment, the entity hauling the material, the entity for whom the material is being hauled, the project for which the material is being provided, and the estimated volume of the material loaded into the first equipment based on the capacity indicator of the first equipment.

6. The method of claim 1, further including defining a progress of a material hauling task assigned to the first equipment based on the degree of completion of the material transport and the position information, the material hauling task including at least one hauling instance of the material.

7. The method of claim 2, wherein:

the first area is defined by a first geofence at a loading station of the source location; and the second area is defined by a second geofence located at the destination location.

8. The method of claim 1, further including:

billing at least one of an operator of the first equipment, an entity hauling the material, and an entity for whom the material is hauled based on the electronic ticket.

9. A system, comprising:

a controller;

a network configured to transmit signals between a communication device associated with a hauling machine and the controller, wherein the controller is configured to:

receive, with the controller, at least one signal from the communication device, the signal including:

position information indicating a position of the hauling machine along a travel path the hauling machine is assigned to traverse extending between a material transfer site to a dump site, and an estimated volume of a material loaded into the hauling machine based on a payload capacity of the hauling machine, determine, based on data from a load sensor of the hauling machine, with the hauling machine at the material transfer site, a sensed volume of material loaded into the hauling machine at the loading position, generate an electronic material ticket based on the estimated volume of material loaded into the hauling machine and the sensed volume of material loaded into the hauling machine, the electronic material ticket including a unique identifier identifying the hauling machine and associating the hauling machine with the estimated and sensed volumes of material loaded into the hauling machine, and define, with the controller, a degree of completion of a material transport based on the position information.

10. The system of claim 9, wherein the signal further includes:

the unique identifier that identifies the hauling machine, wherein the unique identifier is associated with at least one of an operator of the hauling machine, an entity hauling the material, an entity for whom the material is being hauled, and a project for which the material is being provided.

11. The system of claim 10, wherein the controller is further configured to:

generate an invoice associated with at least one of the operator of the hauling machine, the entity hauling the material, the entity for whom the material is being hauled, and the project for which the material is being provided based on the ticket.

12. The system of claim 9, wherein said defining, with the controller, the degree of completion of the material transport based on the position information includes:

identifying presence of the hauling machine within a first area within the material transfer site as an instance of a loading of material into the hauling machine, the first area including the loading position, identifying presence of the hauling machine along the travel path as a material transport instance, and identifying presence of the hauling machine within a second area within the dump site as a material dumping instance.

13. The system of claim 12, wherein:
the first area is defined by a first geofence at a loading station of the material transfer site; and
the second area is defined by a second geofence located at the dump site.

14. The system of claim 13, wherein the degree of completion of the material transport is defined by identification by the controller of the hauling machine being present in at least one of the first geofence, the travel path, and the second geofence.

15. The system of claim 14, further including a user interface communicatively coupled to the controller, the controller further configured to instruct the user interface to display the degree of completion.

16. A method, comprising:
receiving, using a controller, at least one signal from a communication device associated with a hauling machine at a position along a travel path assigned to the hauling machine to traverse, the travel path extending between a first area within a material transfer site to a second area within a dump site, the signal including an estimated volume of a material loaded into the hauling machine based on a payload capacity of the hauling machine;
determining, based on the position of the first hauling machine having been determined to be at a loading position at the first area and departed from the loading position, using the controller, an estimated volume of material loaded into the hauling machine;
determining, using a load sensor of the hauling machine, with the hauling machine being at the material transfer site, a sensed volume of material loaded into the hauling machine at the loading position; and
outputting, using the controller, an electronic material ticket based on the estimated volume of material loaded into the hauling machine and the sensed volume of material loaded into the hauling machine, the electronic material ticket including a unique identifier identifying the hauling machine and associating the hauling machine with the estimated and sensed volumes of material loaded into the hauling machine,
wherein the electronic ticket identifies a purchaser of the material loaded into the hauling machine.

17. The method of claim 16, further including:
identifying, using the controller, a presence of the hauling machine along the travel path as a degree of completion of a material transport; and
instructing, using the controller, a user interface communicatively coupled the controller to display the degree of completion.

18. The method of claim 16, further comprising:
with the controller, identifying within the signal the unique identifier that identities the hauling machine, the unique identifier identifying at least one of an entity associated with an operator of the hauling machine, an entity hauling the material, an entity for whom the material is being hauled, and a project for which the material is being provided; and
with the controller, generating an invoice directed to the entity for at least one of a cost of the material and a cost of a hauling of the material based on the unique identifier.

19. The method of claim 16, wherein:
the first area is defined by a first geofence at a loading station of the material transfer site; and
the second area is defined by a second geofence located at the dump site.

* * * * *